US008599798B2

United States Patent
Iochi et al.

(10) Patent No.: US 8,599,798 B2
(45) Date of Patent: *Dec. 3, 2013

(54) RADIO BASE STATION APPARATUS, RADIO NETWORK CONTROLLER APPARATUS, COMMUNICATION TERMINAL APPARATUS, TRANSMISSION SIGNAL GENERATION METHOD, AND RADIO COMMUNICATION SYSTEM

(75) Inventors: Hitoshi Iochi, Osaka (JP); Hidetoshi Suzuki, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/458,892

(22) Filed: Apr. 27, 2012

(65) Prior Publication Data

US 2012/0218955 A1 Aug. 30, 2012

Related U.S. Application Data

(63) Continuation of application No. 10/520,758, filed as application No. PCT/JP2004/006155 on Apr. 28, 2004, now Pat. No. 8,194,618.

(30) Foreign Application Priority Data

May 13, 2003 (JP) ................................. 2003-135117

(51) Int. Cl.
   *H04B 7/216* (2006.01)
   *H04J 13/00* (2011.01)
   *H04J 3/12* (2006.01)
   *H04J 3/02* (2006.01)

(52) U.S. Cl.
   USPC ........... 370/335; 370/342; 370/441; 370/479; 370/522; 370/537

(58) Field of Classification Search
   None
   See application file for complete search history.

(56) References Cited

U.S. PATENT DOCUMENTS

| 5,832,022 A | 11/1998 | Scott |
| 6,269,075 B1 | 7/2001 | Tran |
| 6,714,528 B1 | 3/2004 | Moon |
| 6,731,692 B1 | 5/2004 | Bhoja |
| 6,882,636 B1 | 4/2005 | Kim |
| 6,985,510 B2 | 1/2006 | Willenegger |
| 7,006,475 B1 | 2/2006 | Suzuki |
| 7,197,021 B2 | 3/2007 | Seo |
| 7,298,721 B2 | 11/2007 | Atarashi |

(Continued)

FOREIGN PATENT DOCUMENTS

| JP | 4-40024 | 2/1992 |
| JP | 2001-217749 | 8/2001 |

(Continued)

OTHER PUBLICATIONS

PCT International Search Report dated Aug. 13, 2004.

(Continued)

*Primary Examiner* — Hassan Phillips
*Assistant Examiner* — Hicham Foud
(74) *Attorney, Agent, or Firm* — Dickinson Wright PLLC

(57) ABSTRACT

A control information channel signal formation unit has a channel encoding section and a spreading section. The channel encoding section multiplexes a plurality of types of control information for a single communication terminal for use in uplink packet transmission, using different symbol patterns between a plurality of types of control information. The spreading section spreads symbols obtained by the channel encoding section using one spreading code.

11 Claims, 27 Drawing Sheets

(56) References Cited

U.S. PATENT DOCUMENTS

| | | |
|---|---|---|
| 7,706,348 B2 | 4/2010 | Kim |
| 2002/0123351 A1 | 9/2002 | Miyoshi |
| 2002/0141367 A1 | 10/2002 | Hwang |
| 2002/0159426 A1 | 10/2002 | Kanemoto |
| 2002/0159470 A1 | 10/2002 | Atarashi |
| 2002/0176438 A1 | 11/2002 | Karjalainen |
| 2005/0037766 A1 | 2/2005 | Hans |
| 2005/0238053 A1 | 10/2005 | Iochi |

FOREIGN PATENT DOCUMENTS

| | | |
|---|---|---|
| JP | 2001-244913 | 9/2001 |
| JP | 2001-274767 | 10/2001 |
| JP | 2002-78007 | 3/2002 |
| JP | 2002-84578 | 3/2002 |
| KR | 2000/0009964 | 2/2000 |
| KR | 2000/0042359 | 7/2000 |
| KR | 2002/0060823 | 7/2002 |
| WO | 99/01994 | 1/1999 |

OTHER PUBLICATIONS

3GPP RAN#30; "AH64: Reducing control channel overhead for Enhanced Uplink," Tdoc R1-03-0067, Jan. 7-11, 2003, pp. 1-2.

TSG-RAN WG1 #31 meeting; "Two Threshold Node B Packet Scheduling," Tdoc R1-03-0129, Feb. 18-21, 2002, pp. 1-4.

TSG-RAN WG1 #31 meeting; "Downlink physical channel structure," Tdoc R1-030177, Feb. 18-21, 2003.

Korean Office Action dated Nov. 15, 2006 with English translation.

European Search Report dated May 10, 2011.

3GPP TS 25.211 V5. 3.0, "3rd Generation Partnership Project; Technical Specification Group Radio Access Network; Physical channels and mapping of transport channels onto physical channels (FDD) (Release 5)," Dec. 2002, pp. 1-51.

European Search Report dated Jul. 4, 2013.

European Office Action dated Jul. 2, 2013.

3GPP RAN1#29, "Details," Motorola, R1-02-1350, XP 050096990, Nov. 5-8, 2002, pp. 1-3.

3GPP TSG-RAN WG1 Meeting #32, "Downlink physical channel structure reusing AICH or PICH," Panasonic, R1-030493, XP 050097614, May 19-23, 2003, pp. 1-3.

H. Holma, et al., "WCDMA for UMTS: Radio Access for Third Generation Mobile Communications," WCDMA for UMTS, XP 055068371, Jun. 7, 2000, pp. 73-99.

3GPP TR 25.896 V0.3.0, "3$^{rd}$ Generation Partnership Project; Technical Specification Group Radio Access Network; Feasibility Study for Enhanced Uplink for UTRA FDD; (Release 6)," R1-030381, XP 050097526, Mar. 2003, pp. 1-40.

3GPP RAN1#29, "Details," Motorola, R1-02-1350, XP 050096990, Nov. 5-8, 2002, pp. 1-5.

| NUMBER OF PAGING INDICATORS (Np) | Pq=1 | Pq=0 |
|---|---|---|
| Np=18 | $\{b_{16q},...,b_{16q+15}\}=\{1,1,...,1\}$ | $\{b_{16q},...,b_{16q+15}\}=\{0,0,...,0\}$ |
| Np=36 | $\{b_{8q},...,b_{8q+7}\}=\{1,1,...,1\}$ | $\{b_{8q},...,b_{8q+7}\}=\{0,0,...,0\}$ |
| Np=72 | $\{b_{4q},...,b_{4q+3}\}=\{1,1,...,1\}$ | $\{b_{4q},...,b_{4q+3}\}=\{0,0,...,0\}$ |
| Np=144 | $\{b_{2q},b_{2q+1}\}=\{1,1\}$ | $\{b_{2q},b_{2q+1}\}=\{0,0\}$ |

RADIO BASE STATION APPARATUS, RADIO NETWORK CONTROLLER APPARATUS, COMMUNICATION TERMINAL APPARATUS, TRANSMISSION SIGNAL GENERATION METHOD, AND RADIO COMMUNICATION SYSTEM

This is a continuation application of application Ser. No. 10/520,758 filed Jan. 11, 2005, which is a national stage of PCT/JP2004/006155 filed Apr. 28, 2004, which is based on Japanese Application No. 2003-135117 filed May 13, 2003, the entire contents of each of which are incorporated by reference herein.

TECHNICAL FIELD

The present invention relates to a technology for transmitting control information necessary for a communication terminal to form an uplink transmission packet from a radio base station to the communication terminal.

BACKGROUND ART

Conventionally, various improvements have been made about a scheme for enabling high-speed packet transmission on a downlink from a radio base station to a communication terminal (e.g., HSDPA (High Speed Downlink Packet Access)). This entails an expansion which enables large-volume or low delay data transmission on an uplink channel from the communication terminal to the radio base station, too, and studies on a scheme for realizing high-speed packet communication on an uplink channel (e.g., Enhanced Uplink DCH) are underway.

As with the downlink, studies on the introduction of a scheduling technology for an expansion of such high-speed packet communication to an uplink channel are also underway. The base station carries out scheduling on uplink packets and the base station sends scheduling information created to each communication terminal. Each communication terminal transmits uplink packets to the base station based on the scheduling information received from the base station.

As the scheduling method by the base station, there are proposals on a method called "Base-station Controlled Scheduled Transmission" and a method called "Base-station Controlled Rate Scheduling."

Of these methods, the method called "Base-station Controlled Scheduled Transmission" is similar to scheduling when high-speed packet transmission is performed on a downlink such as HSDPA. That is, the base station selects several communication terminals for transmitting uplink channel packets and instructs only the selected communication terminals on a (maximum) transmission rate or transmit power margin, etc.

A method of transmitting control information such as scheduling information from the base station to each communication terminal (hereinafter this may be referred to as "downlink control information") in this case is described in "3GPP, R1-030067, "Reducing control channel overhead for Enhanced Uplink" (hereinafter this will be referred to as "Document 1"). This method is for transmitting downlink control information for each communication terminal selected by scheduling using a downlink channel called "Downlink Scheduling Assignment Control Channel." That control information consists of transmission timing information, transmit power margin information, identification number for identifying the destination communication terminal (included in a CRC) and a Tail bit for coding.

The method called "Base-station Controlled Rate Scheduling" also causes the base station to assume the responsibility for rate control in uplink channel packet transmission which used to be carried out at a relatively low speed by an RNC (Radio Network Controller) so as to perform rate control at a high speed. This rate control can be realized with additions of a relatively small number of functions for a communication terminal and an improvement of throughput is also expected on the other hand, and therefore this can be considered as an effective method.

This rate control method is explained in "3GPP, R1-03-0129, Two Threshold NodeB Packet Scheduling" (hereinafter referred to as "Document 2"). More specifically, by sending control information instructing an increase/decrease of a transmission rate made up of Up/Down/Keep called "RG (Rate Grant) information" to all communication terminals carrying out uplink packet transmission, the base station controls a maximum transmission rate of each communication terminal individually. Since a Keep command can be expressed by "not transmitting RG information (no transmission)", it is possible to actually send Up/Down. The communication terminal transmits uplink packets at a maximum transmission rate or below in consideration of a transmit power margin and amount of data. However, transmitting these two values of Up/Down is only an example and it is also possible to instruct an increase/decrease of the transmission rate in further detail if downlink control information can transmit a plurality of bits.

The aforementioned Document 2 describes that it is also possible to apply a technology of hybrid ARQ, etc., at the same time. That is, downlink control information to be transmitted from a base station to a communication terminal can be ACK/NACK of hybrid ARQ, etc., in addition to RG information.

In uplink packet transmission using "Base-station Controlled Rate Scheduling", improvements in actually transmitting downlink control information are described in the "3GPP, R1-030177, Downlink physical channel structure" (hereinafter referred to as "Document 3"). This Document 3 describes a method of transmitting downlink control information embedded in a dedicated channel for each communication terminal such as DPDCH (Dedicated Physical Data channel) or DPCCH (Dedicated Physical Control Channel).

FIG. 1 shows a configuration example of a radio base station apparatus for realizing this method. First, the transmission system of a radio base station apparatus 10 will be explained. The radio base station apparatus 10 is provided with a plurality of dedicated channel signal formation units 11-1 to 11-N that form transmission signals directed to their respective communication terminal apparatuses. That is, there are N dedicated channel signal formation units 11-1 to 11-N corresponding to N communication terminals with which they communicate. Since processes of the respective dedicated channel signal formation units 11-1 to 11-N are the same, the configuration of only one dedicated channel signal formation unit 11-1 will be explained here.

The dedicated channel signal formation unit 11-1 multiplexes a pilot signal (PILOT), transmission data, uplink channel transmit power control command (UL-TPC), ACK/NACK and RG information through a channel encoding section 12. Before being multiplexed, the transmission data is subjected to error correcting coding. The multiplexed signal is modulated by a modulation section 13 and sent to a spreading section 14.

The spreading section 14 carries out spreading processing on the modulated signal using a spreading code specific to the communication terminal. That is, the dedicated channel signal formation units 11-1 to 11-N carry out spreading processing using different spreading codes. The spread signal is sent to an amplification section 15. The amplification section 15 increases/decreases power of the spread signal according to a transmit power control signal from a transmit power control section 16 and sends the amplified signal to a transmission radio section 17.

In this way, the dedicated channel signals specific to the respective communication terminals obtained from the dedicated channel signal formation units 11-1 to 11-N using different spreading codes are output. The dedicated channel signals are subjected to predetermined radio processing such as analog/digital conversion and up-conversion, etc., by the transmission radio section 17 and transmitted through an antenna 18.

Next, the reception system of the radio base station apparatus 10 will be explained. The radio base station apparatus 10 inputs a signal received from the antenna 18 to a reception radio section 20. The reception radio section 20 carries out predetermined radio processing such as down-conversion and analog/digital conversion on the received signal to obtain a received baseband signal and sends this baseband signal to reception processing units 21-1 to 21-N provided for the N communication terminals. Since processes of the dedicated channel signal formation units 21-1 to 21-N are the same, only the configuration of the dedicated channel signal formation unit 21-1 will be explained here.

A despreading section 22 carries out despreading processing on the received baseband signal using a spreading code corresponding to the communication terminal, extracts a dedicated channel signal sent from the communication terminal apparatus and outputs the dedicated channel signal to a demodulation section 23. Furthermore, the despreading section 22 sends information indicating desired signal power obtained from a delay profile to be created during dispreading to an SIR measuring section 29.

The demodulation section 23 carries out demodulation processing on the output signal of the despreading section 22 and sends the demodulated signal to a channel decoding section 24. The channel decoding section 24 carries out decoding processing such as error correcting decoding on the output signal of the demodulation section 23 and extracts received data, downlink transmit power control command (DL-TPC), etc. The received data is sent to a higher level control station and the DL-TPC is sent to the transmit power control section 16.

The SIR measuring section 29 calculates interference signal power from a variance of the desired signal power, calculates a ratio (SIR) of the desired signal power to the interference signal power and sends information indicating the SIR to the TPC generation section 30 and scheduling section 32. The TPC generation section 30 generates an uplink channel transmit power control command (UL-TPC) for instructing an increase/decrease of transmit power of the uplink channel based on a magnitude relationship between a reception SIR and target SIR of the uplink channel and sends this UL-TPC to the channel encoding section 12.

The scheduling section 32 decides a communication terminal apparatus for which transmission of packet data is allowed based on rate request information (RR information) from each communication terminal apparatus, the SIR and a reception power margin from the reception power measuring section 31 and decides parameters (coding rate of error correcting coding, modulation multi-value number, spreading factor, transmit power, etc.) during the packet data transmission as RG information (scheduling). Then, the scheduling section 32 sends this RG information to the channel encoding section.

The reception power measuring section 31 calculates a reception power margin based on reception power from the reception radio section 20 and maximum reception power and sends the reception power margin to the scheduling section 32.

A despreading section 25 carries out despreading processing on the received baseband signal using the same spreading factor as that used for spreading the uplink packet data by the communication terminal. Information such as the spreading factor of this uplink packet data, modulation multi-value number, coding rate, etc., is embedded in the signal by the communication terminal and transmitted, and the radio base station apparatus 10 extracts the information embedded in the received data and notifies the despreading section 25, demodulation section 26 and channel decoding section 27 of the information. That is, the despreading section 25, demodulation section 26 and channel decoding section 27 are constructed so as to be able to change the spreading factor, modulation multi-value number and coding rate according to the transmission parameter information from the communication terminal.

The demodulation section 26 carries out demodulation processing on the packet signal output from the despreading section 25 and sends the demodulated signal to the channel decoding section 27. The channel decoding section 27 carries out decoding processing such as error correcting decoding on the demodulated signal, extracts received packet data and outputs the packet data to an error detection section 28. Furthermore, the channel decoding section 27 extracts rate request information (RR information) and sends the rate request information to the scheduling section 32.

The error detection section 28 carries out error detection on the received packet data. When no error is detected, the error detection section 28 outputs the received packet data to a higher level station and sends an ACK signal indicating that the data has been demodulated correctly to the channel encoding section 12. On the other hand, when an error is detected, the error detection section 28 sends a NACK signal indicating that the data has not been demodulated correctly to the channel encoding section 12.

FIG. 2 shows the configuration of a communication terminal apparatus which communicates with the radio base station apparatus 10. The communication terminal apparatus 40 inputs a signal received through an antenna 41 to a reception radio section 42. The reception radio section 42 applies down-conversion and analog/digital conversion processing on the received signal to obtain a received baseband signal and sends this baseband signal to a despreading section 43.

The despreading section 43 carries out despreading processing using a spreading code specific to this communication terminal to obtain a signal directed to the own station. The despread signal is subjected to demodulation processing and decoding processing sequentially by a demodulation section 44 and a channel decoding section 45, and received data, uplink channel transmit power control command (UL-TPC), transmission rate information (RG information) and ACK/NACK are thereby obtained. Furthermore, the despread signal is input to an SIR measuring section 46 and a TPC generation section 47 sequentially and a downlink transmit power control command (DL-TPC) is thereby obtained from the TPC generation section 47.

Next, the transmission system of the communication terminal apparatus 40 will be explained. While the communication terminal apparatus 40 changes a coding rate, modulation multi-value number or spreading factor for transmission packet data, the communication terminal apparatus 40 does not change these parameters for other data. More specifically, a pilot signal (PILOT), downlink signal transmit power control command (DL-TPC) or transmission data is processed by a channel encoding section 50, a modulation section 51 and a spreading section 52 whose coding rate, modulation multi-value number and spreading factor are fixed respectively and then the spread signal is sent to an amplification section 53.

On the other hand, the transmission packet data is stored in a buffer 54 first. Based on the ACK/NACK, the buffer 54 erases the transmission packet data transmitted last time and outputs the initial transmission packet data to a channel encoding section 59 in the case of ACK, whereas the buffer 54 outputs the transmission packet data sent last time to the channel encoding section 59 again in the case of NACK.

Furthermore, an amount of transmission packet data stored in the buffer 54 is measured by a data amount measuring section 55 and the data amount measuring section 55 sends the measurement result to a transmission rate selection section 57 and a rate request selection section 56.

The transmission rate selection section 56 selects a transmission rate at which data is actually transmitted based on the RG information sent from the radio base station apparatus 10 and extracted from the channel decoding section 45, that is, transmission rate information, amount of data stored in the buffer 54 and transmit power margin and notifies the rate request selection section 56 of the selected transmission rate and also notifies a transmission parameter setting section 58 of the same.

The rate request selection section 56 generates rate request information (RR information) based on the transmission rate notified from the transmission rate selection section 57, amount of data stored in the buffer 54 and transmit power margin and sends the rate request information to the channel encoding section 59. This RR information is information indicating a transmission rate of transmission packet data desired by the communication terminal apparatus and is expressed by, for example, 1 to n (n is a natural number of 2 or above).

Based on the transmission rate notified from the transmission rate selection section 57, the transmission parameter setting section 58 controls the reading rate of the transmission packet data stored in the buffer 54, sets the coding rate at the channel encoding section 59, modulation multi-value number at a modulation section 60 and the spreading factor at a spreading section 61 and sends these transmission parameters to the channel encoding section 59, modulation section 60 and spreading section 61. Furthermore, based on the transmission rate, the transmission parameter setting section 58 sets an amount of offset of transmit power when packet data is transmitted and sends this amount to a transmit power control section 63.

The transmit power margin input to the transmission rate selection section 57 and rate request selection section 56 is set by a transmit power measuring section 65. More specifically, the transmit power measuring section 65 sets the transmit power margin based on transmit power controlled by a transmit power control section 64 according to an uplink channel transmit power control command (UL-TPC) and maximum transmit power that can be transmitted by the own apparatus. The transmit power control section 63 that generates a transmit power control signal of packet data generates a transmit power control signal which is obtaining by giving an offset set by the transmission parameter setting section 58 to the control signals from the transmit power control section 64 such as other pilot signal, downlink transmit power control command (DL-TPC) and transmit power control signal of transmission data.

The spread signals output from the spreading section 52 and spreading section 61 are amplified independently by corresponding amplification sections 53, 62, subjected to predetermined radio processing such as digital/analog conversion and up-conversion by a transmission radio section 66 and transmitted through the antenna 41.

In the conventional radio base station apparatus 10 and communication terminal apparatus 40 having the structures shown in FIG. 1 and FIG. 2, the radio base station apparatus 10 transmits control information for uplink packet transmission such as RG information and ACK/NACK embedded in a dedicated channel. The communication terminal apparatus 40 extracts a control signal directed to the own station from the received signal by despreading the received signal using a dedicated spreading code. Then, the communication terminal apparatus 40 decides the transmission rate of transmission packet data or whether retransmission is necessary or not based on this control signal and forms an uplink packet signal.

FIG. 3 shows the states of the respective dedicated channels transmitted from the radio base station apparatus 10. Dedicated channel signals (communication terminal 1 dedicated ch to communication terminal N dedicated ch) directed to the communication terminals 1 to N are formed by the aforementioned dedicated channel signal formation units 11-1 to 11-N. In each dedicated channel, control information for forming uplink packet signals such as RG information and ACK/NACK expressed by shaded areas in the figure is embedded between transmission data. Here, each dedicated channel is spread using a spreading code specific to each communication terminal, and therefore even if a plurality of dedicated channel signals is received at the same time, each communication terminal can extract only the transmission data and control information directed to the own station and can form an uplink packet signal adequately based on the extracted control information.

When control information (downlink control information) for forming an uplink packet signal is transmitted using a method shown in "3GPP, R1-030067, "Reducing control channel overhead for Enhanced Uplink" if information is transmitted only to a selected communication terminal through scheduling as a method called "Base-station Controlled Scheduled Transmission", there should be only the same number of downlink channels for transmitting control information as the selected communication terminals.

However, when downlink control information is transmitted to all communication terminals simultaneously as in the case of a method called "Base-station Controlled Rate Scheduling", downlink control information channels corresponding in number to all the communication terminals are required. As a result, there is a problem that resources of downlink spreading codes are overconsumed.

Furthermore, in the method called "Base-station Controlled Rate Scheduling", even if only control information indicating an increase/decrease of a transmission rate is sent, it is necessary to add numbers for identifying to which communication terminal the control information is directed to the control information. This causes a problem that overhead increases and transmit power resources on a downlink are overconsumed. Furthermore, when downlink transmit power resources are overconsumed, interference with other cells increases, leading to a reduction of a system capacity.

On the other hand, as indicated in "3GPP, R1-030177, Downlink physical channel structure", that is, as is implemented with the configurations shown in FIG. 1 and FIG. 2, when the downlink control information for forming an uplink packet signal is embedded in a dedicated channel of each communication terminal which is carrying out uplink packet transmission, it is possible to transmit control information to all communication terminals, but there is also a problem of producing adverse effects on existing dedicated channels. Moreover, transmitting downlink control information embedded in the existing dedicated channels without errors needs to increase transmit power of the downlink control information, which results in a problem that the downlink transmit power resources are overconsumed.

For example, when control information is embedded in a data channel called "DPDCH" (channel to mainly transmit speech data and signaling, etc., from a higher level apparatus), the number of bits on a physical channel available for dedicated channel data is decreased, which leads to a problem that the quality of transmission data deteriorates. Compensating for this quality deterioration requires transmit power of a dedicated channel to be increased.

Furthermore, when control information is embedded in a control channel called "DPCCH", there is a proposal on assignment of the bit of TFCI (used to notify the receiving side of the data size of a plurality of channels multiplexed in the DPDCH" to this control information. But this also deteriorates the reception performance of TFCI, increasing the probability that reception processing of dedicated channels will not be performed correctly.

Furthermore, when a standardization specification using dedicated channels is already determined, changing the standardization specification of a downlink dedicated channel produces another problem that not only a test on uplink channel packet transmission but also a test on dedicated channels needs to be done again.

DISCLOSURE OF INVENTION

It is an object of the present invention to provide a radio base station apparatus, communication terminal apparatus and method of transmitting control information capable of transmitting control information directed to each communication terminal for each communication terminal to transmit uplink packets using a dedicated channel to all communication terminals carrying out uplink packet transmission without transmitting identification information or without changing dedicated channels.

This object can be attained when a radio base station apparatus transmits control information for each communication terminal to transmit uplink packets using a dedicated channel to a plurality of communication terminal apparatuses, by the radio base station apparatus multiplexing control information directed to the plurality of communication terminals based on a multiplexing rule preset between the radio base station apparatus and the communication terminals and spreading the control information using a spreading code common to the communication terminals.

Thus, the radio base station apparatus spreads control information directed to a plurality of terminals using a spreading code common to the respective communication terminal apparatuses, and can thereby suppress consumption of spreading code resources on a downlink, and the communication terminal apparatuses can extract control information directed to the own station adequately from the multiplexed signal according to the preset multiplexing rule.

The following embodiments will explain improvements to the method of creating preferable multiplexing rules when multiplexing control information. Furthermore, the present invention will propose a diversion of the data structures of existing PICH (Page Indication Channel) or AICH (Acquisition Indication Channel).

BRIEF DESCRIPTION OF DRAWINGS

FIG. 9 is a table showing a relationship between the number of paging indicators and PICH bit mapping;

FIG. 22 illustrates a symbol pattern used as an acquisition indicator;

BEST MODE FOR CARRYING OUT THE INVENTION

With reference now to the attached drawings, embodiments of the present invention will be explained in detail below.

Embodiment 1

Figure 4:
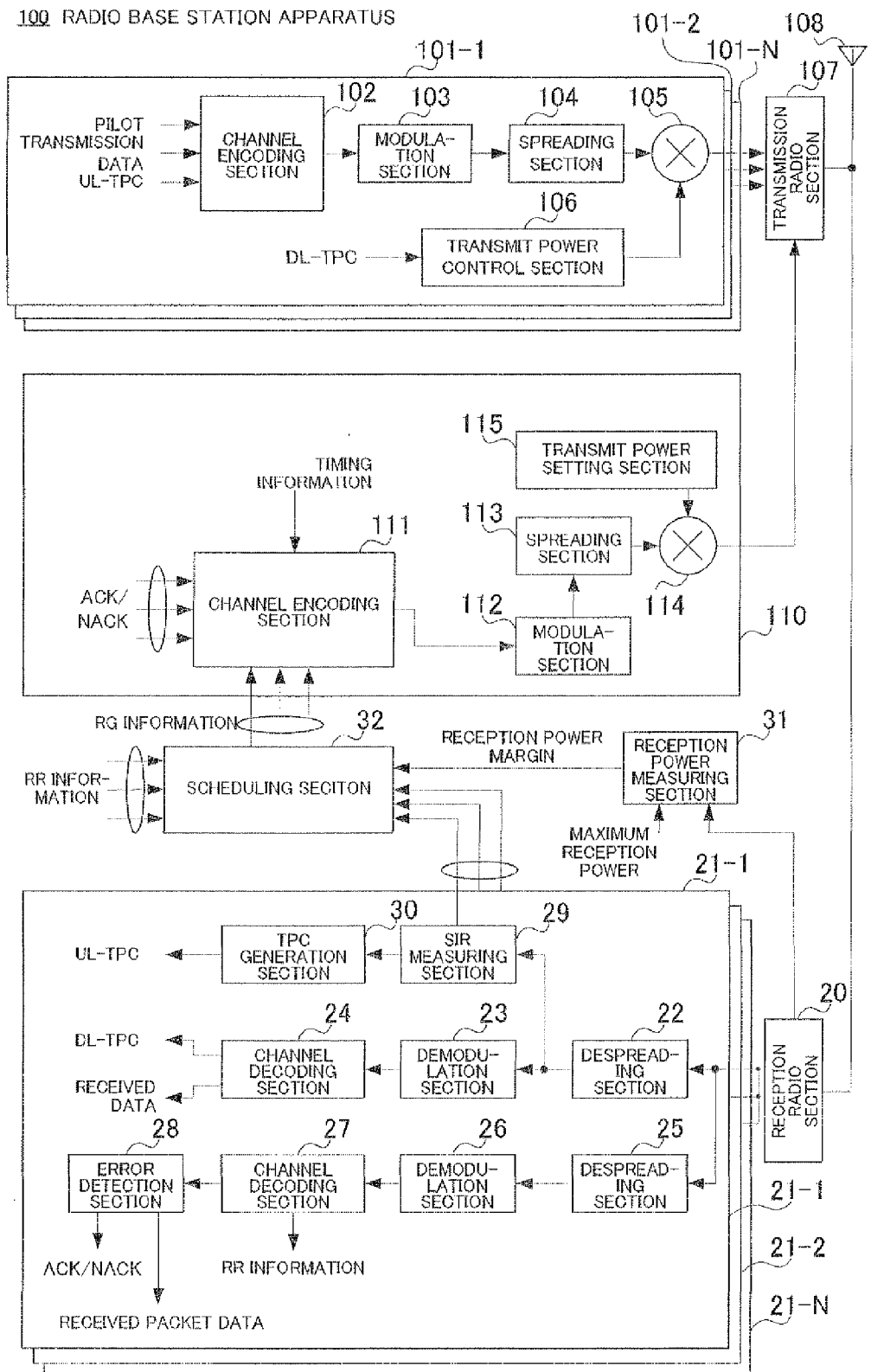
FIG. 4 is a block diagram showing the configuration of a radio base station apparatus according to Embodiment 1 of the present invention.

FIG. 4 illustrates the configuration of a radio base station apparatus according to Embodiment 1 of the present invention. The radio base station apparatus 100 is provided with dedicated channel signal formation units 101-1 to 101-N corresponding in number to communication terminals carrying out communication and a control information channel signal formation unit 110.

The dedicated channel signal formation units 101-1 to 101-N function as a first transmission signal formation section, spread transmission data directed to each communication terminal using a spreading code assigned to each communication terminal and thereby form a dedicated channel signal directed to each communication terminal.

On the other hand, the control information channel signal formation unit 110 functions as a second transmission signal formation section, multiplexes control information directed to each communication terminal for each communication terminal to carry out uplink packet transmission using a dedicated channel based on a multiplexing rule preset between the base station apparatus and each communication terminal, spreads the control information using a spreading code common to the communication terminals in a cell and thereby forms a control information channel signal.

Since processes of the respective dedicated channel signal formation units 101-1 to 101-N are the same, only the configuration of one dedicated channel signal formation unit 101-1 will be explained here. The dedicated channel signal formation unit 101-1 multiplexes a pilot signal (PILOT), transmission data and uplink channel transmit power control command (UL-TPC) through a channel encoding section 102. Before being multiplexed, the transmission data is subjected to error correcting coding processing. The multiplexed signal is subjected to modulation processing by a modulation section 103 and then sent to a spreading section 104.

The spreading section 104 carries out spreading processing on the modulated signal using a spreading code specific to the communication terminal. That is, the respective dedicated channel signal formation units 101-1 to 101-N carry out spreading processing using different spreading codes. The signal subjected to the spreading processing is sent to an amplification section 105. The amplification section 105 amplifies power of the spread signal according to a transmit power control signal from a transmit power control section 106 and sends the amplified signal to a transmission radio section 107.

Thus, dedicated channel signals specific to the respective communication terminals formed using different spreading codes are output from the respective dedicated channel signal formation units 101-1 to 101-N.

Figure 6:
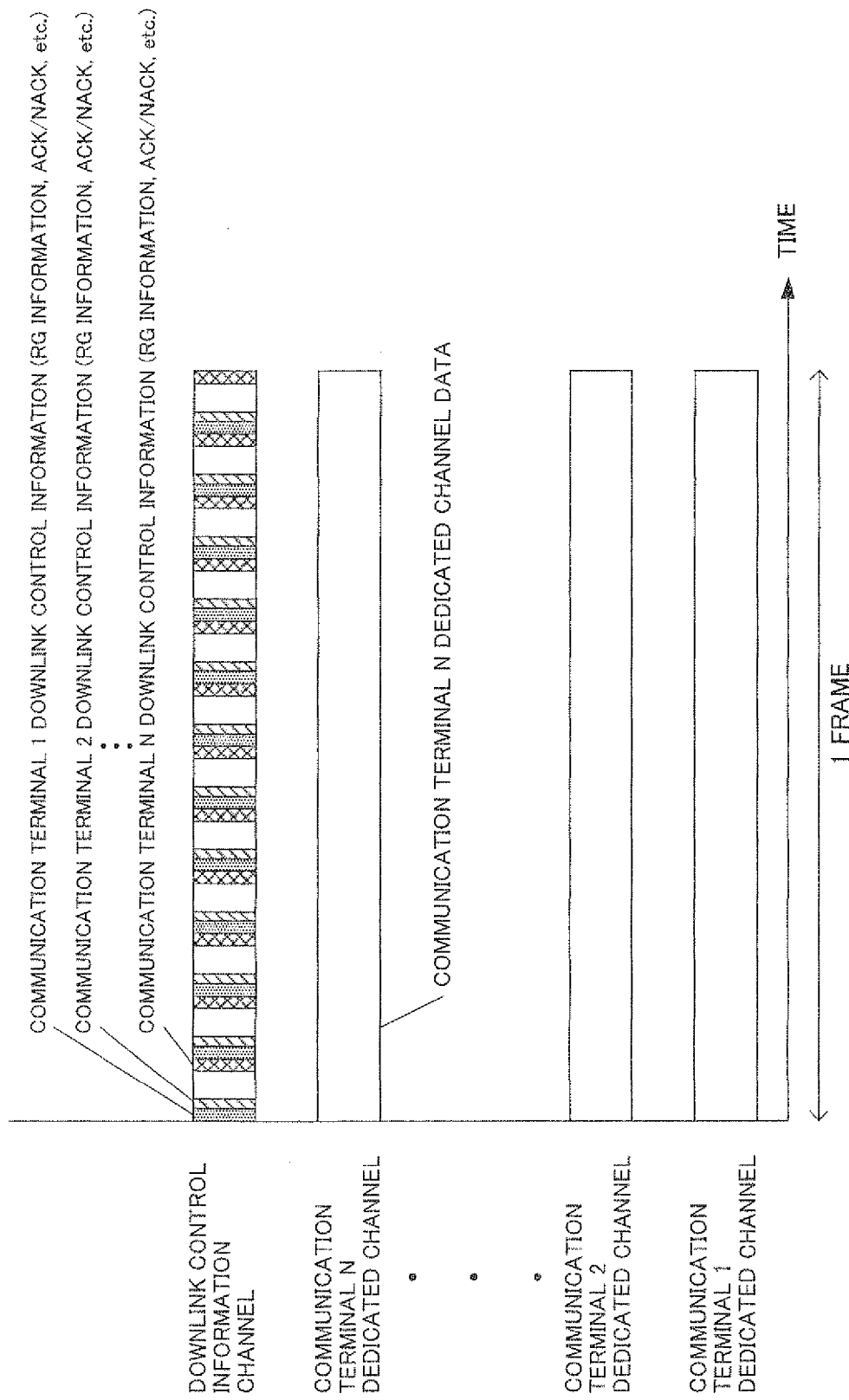
FIG. 6 illustrates states of various channel signals obtained by the radio base station apparatus of Embodiment 1.

On the other hand, the control information channel signal formation unit 110 inputs RG information directed to each communication terminal obtained from a scheduling section 32 to a channel encoding section 111 and inputs ACK/NACK directed to each communication terminal obtained from an error detection section 28. The channel encoding section 111 time-division multiplexes ACK/NACK and RG information directed to each communication terminal at positions predetermined between the base station apparatus and each communication terminal based on timing information. FIG. 6 shows this state. The output from the channel encoding section 111 is subjected to modulation processing by a modulation section 112 and sent to a spreading section 113.

The spreading section 113 spreads the modulated signal using a spreading code common to all the communication terminals with which the base station apparatus is communicating. The spread signal is sent to an amplification section 114. The amplification section 114 amplifies power of the spread signal according to a transmit power control signal from a transmit power setting section 115 and sends the amplified signal to the transmission radio section 107.

In this way, the control information channel signal formation unit 110 time-division multiplexes control information (RG information (transmission rate information), ACK/NACK in this embodiment) for each communication terminal to perform uplink packet transmission using a dedicated channel at a timing determined between the base station apparatus and the communication terminal and outputs a control information channel signal spread using a spreading code common to the communication terminals.

Figure 1:
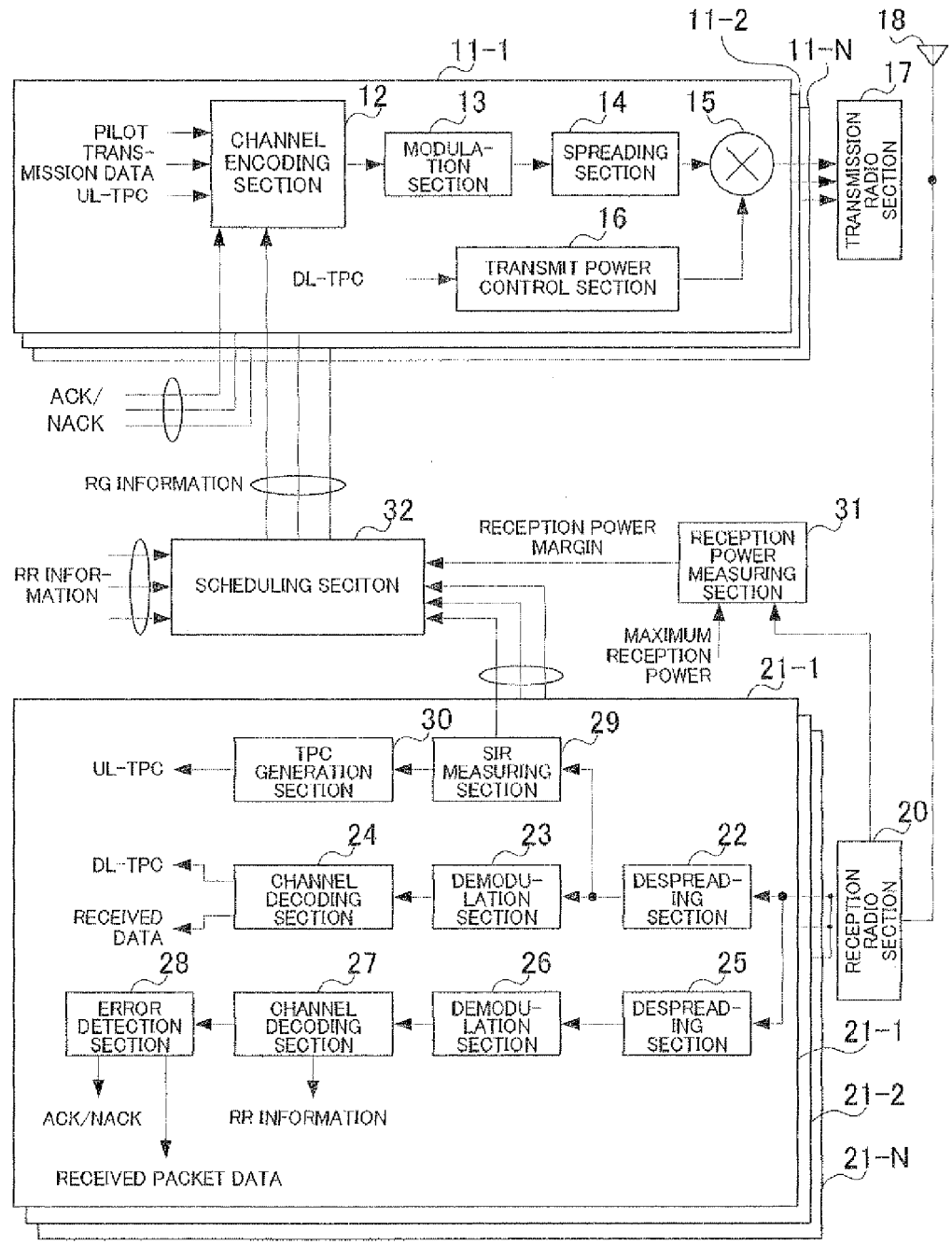
FIG. 1 is a block diagram showing the configuration of a conventional radio base station apparatus.

The reception system of the radio base station apparatus 100 has a configuration similar to that of the transmission system of the aforementioned radio base station apparatus 10 shown in FIG. 1, and therefore the same components are assigned the same reference numerals in FIG. 1 and explanations thereof will be omitted.

Figure 2:
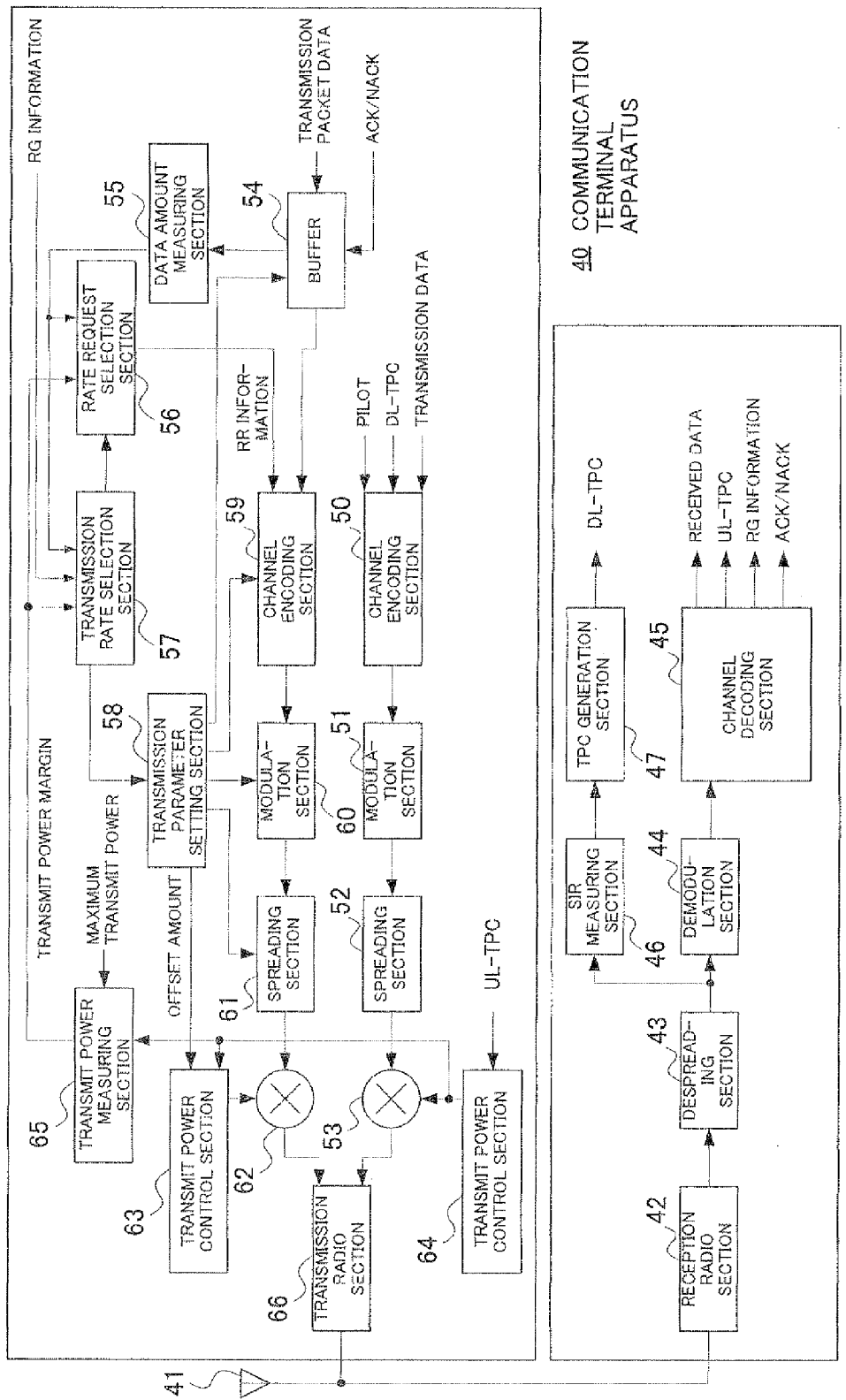
FIG. 2 illustrates the configuration of a conventional communication terminal apparatus.

Next, using FIG. 5 in which the components corresponding to those in FIG. 2 are assigned the same reference numerals, the configuration of a communication terminal apparatus that communicates with the radio base station apparatus 100 will be explained. Here, explanations of the same components as those in FIG. 2 will be omitted.

The communication terminal apparatus 200 of this embodiment despreads a received baseband signal output from a reception radio section 42 using a spreading code common to the communication terminals in the cell through a despreading section 201 and thereby extracts a control information channel signal. A despreading section 43 carries out despreading processing using a spreading code individually assigned to the own station to thereby extract a dedicated channel signal.

The despread signal output from the despreading section 201 is demodulated by a demodulation section 202 and input to a channel decoding section 203. The channel decoding section 203 extracts control information directed to the own station out of the control information directed to the communication terminals time-division multiplexed on a control information channel, that is, RG information and ACK/NACK based on the timing information. The communication terminal apparatus 200 controls the transmission rate of uplink transmission packet data based on the extracted RG information and controls retransmission of the uplink transmission packet data based on the extracted ACK/NACK.

The transmission system of the communication terminal apparatus 200 has a configuration similar to that of the transmission system of the communication terminal apparatus 40 described above using FIG. 2, and therefore the same components as those in FIG. 2 are assigned the same reference numerals and explanations thereof will be omitted.

Next, the operations of the radio base station apparatus 100 and communication terminal apparatus 200 of this embodiment will be explained. When transmitting transmission data directed to each communication terminal using a dedicated channel, the radio base station apparatus 100 transmits control information (RG information and ACK/NACK) directed to each communication terminal for each communication terminal to transmit uplink packet transmission using a dedicated channel, using a channel for control information spread using a spreading code common to the communication terminals.

As a result, even when downlink control information is sent to all communication terminals in communication simultaneously using a method called "Base-station Controlled Rate Scheduling", it is possible to suppress an increase in the number of channels and save downlink spreading code resources. Furthermore, control information for uplink packet transmission is sent using a channel for control information transmitted through a second transmission signal formation section which is different from the dedicated channel transmitted through the first transmission signal formation section, and therefore it is possible to avoid reducing the number of bits on a physical channel available for dedicated channel data and it is possible to avoid quality deterioration of transmission data on the downlink as a consequence. Furthermore, even when a standardization specification using a dedicated channel is already determined, it is possible to transmit control information for the communication terminal to carry out uplink packet transmission using a dedicated channel without changing the standardization specification of the dedicated channel on the downlink.

In addition, the radio base station apparatus 100 determines a timing for placing control information between the base station apparatus and each communication terminal (that is, determines a multiplexing rule for time-division multiplexing) and time-division multiplexes control information directed to each communication terminal. As a result, the communication terminal apparatus 200 can extract control information directed to the own station at a predetermined timing from among the time-division multiplexed control information.

Therefore, in transmitting control information directed to all communication terminals through a channel using the same spreading code, it is not necessary to add identification information to identify to which communication terminal the control information is directed, in other words, it is only necessary to transmit control information, and therefore it is possible to avoid an increase of overhead.

Thus, this embodiment time-division multiplexes control information for each communication terminal to carry out uplink packet transmission using a dedicated channel at a position predetermined between the base station apparatus and each communication terminal, spreads and transmits the control information using a spreading code common to the communication terminals, and can thereby realize the radio base station apparatus 100 capable of transmitting control information on uplink packet transmission to all communication terminals carrying out uplink packet transmission without transmitting numbers identifying the communication terminals or without changing dedicated channels.

In addition, the present inventor et al. considered that it would be possible to divert a PICH (Page Indication Channel) transmission circuit at the base station and a PICH reception circuit at the communication terminal by transmitting the control information time-division multiplexed using an existing PICH data structure as the control information channel and suppress the increase in the circuit scales of the base station and communication terminal. The time-division multiplexing method of control information using the PICH will be explained below.

Figure 7:
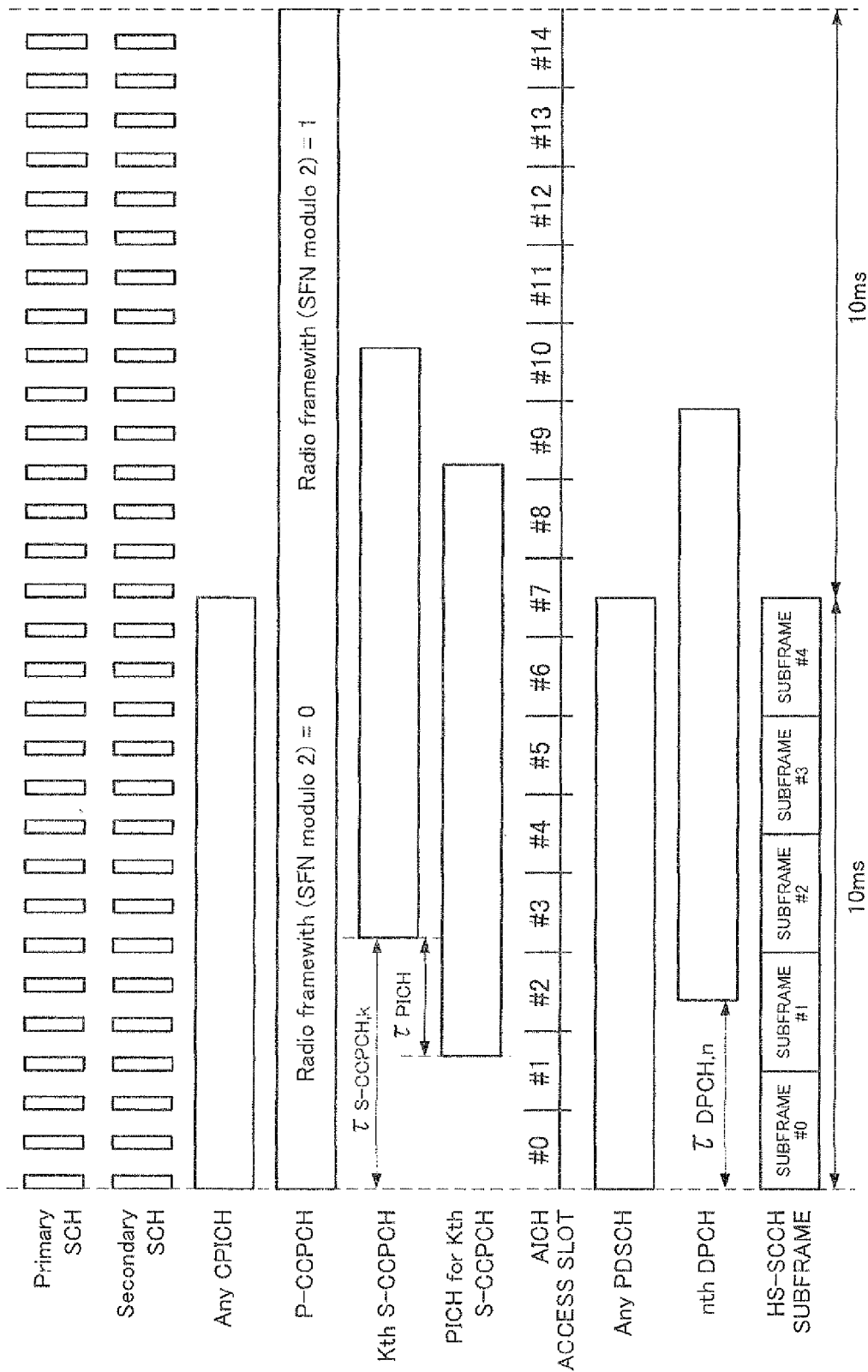
FIG. 7 illustrates a timing relationship on a downlink physical channel.

First, a general PICH will be explained. The PICH is a common channel of a downlink used to predict the existence of paging (ringing indicating arrival of a call). The PICH is broadcast to all communication terminals on standby in the same cell. Each communication terminal is aware of a timing assigned to the own station in the PICH and extracts a paging indicator directed to the own station from the PICH at that timing. FIG. 7 shows a timing relationship between the PICH and other downlink physical channels.

More specifically, a paging message is sent through an S-CCPCH (Secondary Common Control Physical Channel) of 10 ms long. When there is a plurality of S-CCPCH channels, the kth S-CCPCH is sent with a timing offset of τS-CCPCH, k with respect to a P-CCPCH which is a reference timing of the cell. The PICH is transmitted with a timing offset of τPICH with respect to this kth S-CCPCH.

Figure 8:
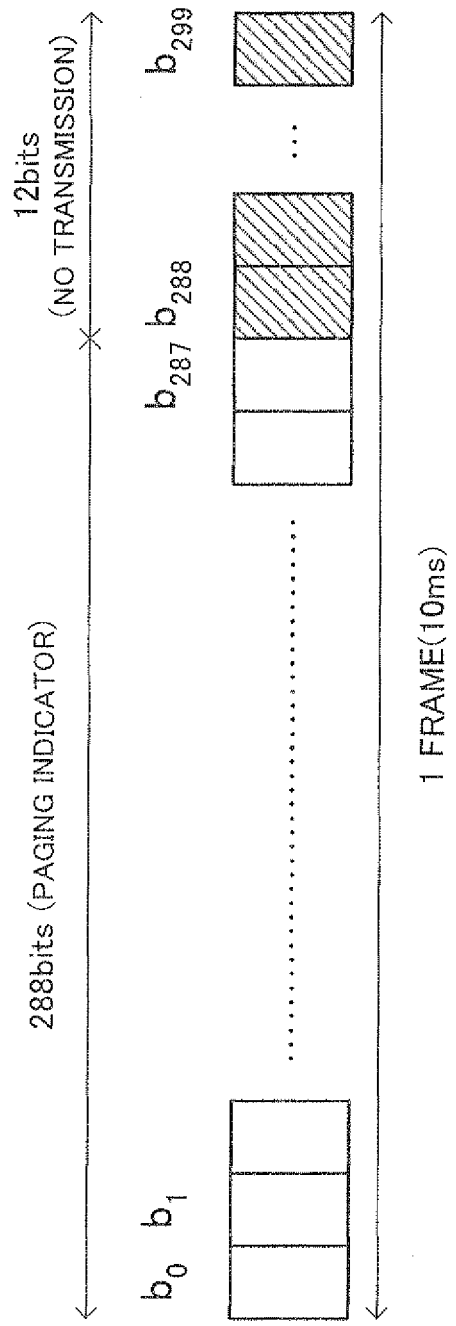
FIG. 8 illustrates a PICH frame configuration.

FIG. 8 shows the frame configuration of the PICH. The PICH is a physical channel at a fixed rate (spreading factor SF=256) for transmitting a paging indicator. The PICH always relates to the S-CCPCH which transmits a paging message. The PICH frame consists of 300 bits in 10 ms. Of these bits, 288 bits are used to transmit paging indicators (PI) and the remaining 12 bits correspond to no transmission (DTX).

Of each PICH frame, Np paging indicators are time-division multiplexed and transmitted in order of $\{P0, \ldots, PNp-1\}$. Here, the number of paging indicators Np within 1 frame is any one of 18, 36, 72 or 144. The information transmitted with one paging indicator is two values of 1/0. The number of bits on the PICH with respect to one paging indicator is 288/Np. The communication terminal belongs to any one of Np groups and receives a paging indicator at the timing of the own group. The timing of the paging indicator is defined by the following expression and randomized so that the timing of each paging indicator in the frame varies from one frame to another.

$$q = \left(PI + \left\lfloor ((18 \times (SFN + \lfloor SFN/8 \rfloor + \lfloor SFN/64 \rfloor + \lfloor SFN/512 \rfloor)) \bmod 144) \times \frac{Np}{144} \right\rfloor\right) \bmod Np$$

In the above expression, $\lfloor \ \rfloor$ denotes a drop of the fractional portion, SFN denotes a system frame number of a P-CCPCH radio frame during which the PICH radio frame starts. The bit assignment in the paging indicator for every number of paging indicators Np (Np=18, 36, 72, 144) is shown in FIG. 9 as a reference. As is also evident from this figure, the number of repetitive bits in each paging indicator decreases as the number of paging indicators Np increases.

This embodiment proposes the following three methods ①, ② and ③ as the methods for transmitting control information on uplink packet transmission diverting such a PICH data structure:

① One paging indicator is assigned to only one communication terminal so as to realize control for each communication terminal. This is because assigning the same paging indicator to a plurality of communication terminals of the same paging group prevents control for each communication terminal. Since each paging indicator can transmit two values of 1/0, it is possible to perform mapping, for example, of +1=up, −1=down as rate control. To realize "keep" of the rate control, it is possible to introduce a no transmission section (DTX). Furthermore, when ACK/NACK of HARQ is transmitted, it is possible to perform mapping of +1=ACK, −1=NACK.

② A plurality of paging indicators is assigned to one communication terminal. This allows control information to be transmitted to one communication terminal for each slot (in other words, a plurality of times per frame), and therefore high-speed control can be realized. Furthermore, it is also possible to perform control requiring a plurality of bits (e.g., high accuracy rate control using a plurality of bits or both rate control and control of ACK/NACK). Since the timing corresponding to one paging indicator is once per frame, it is effective to assign a plurality of paging indicators to one communication terminals for high-speed control or control requiring a plurality of bits.

③ In the above described expression, suppose q=PI. This makes the timing at which paging indicator PI is transmitted constant regardless of the frame. This is because with randomization according to the above described expression, the timing at which a paging indicator directed to the communication terminal is transmitted changes from one frame to another, producing a variation in control intervals.

Thus, transmitting control information using such methods ① to ③ by diverting the existing PICH data structure allows the PICH transmission circuit at the base station and the PICH reception circuit at the communication terminal to be diverted without adding any new data structure for a new downlink channel, making it possible to suppress an increase in the circuit scales of the base station and communication terminal.

Figure 10:
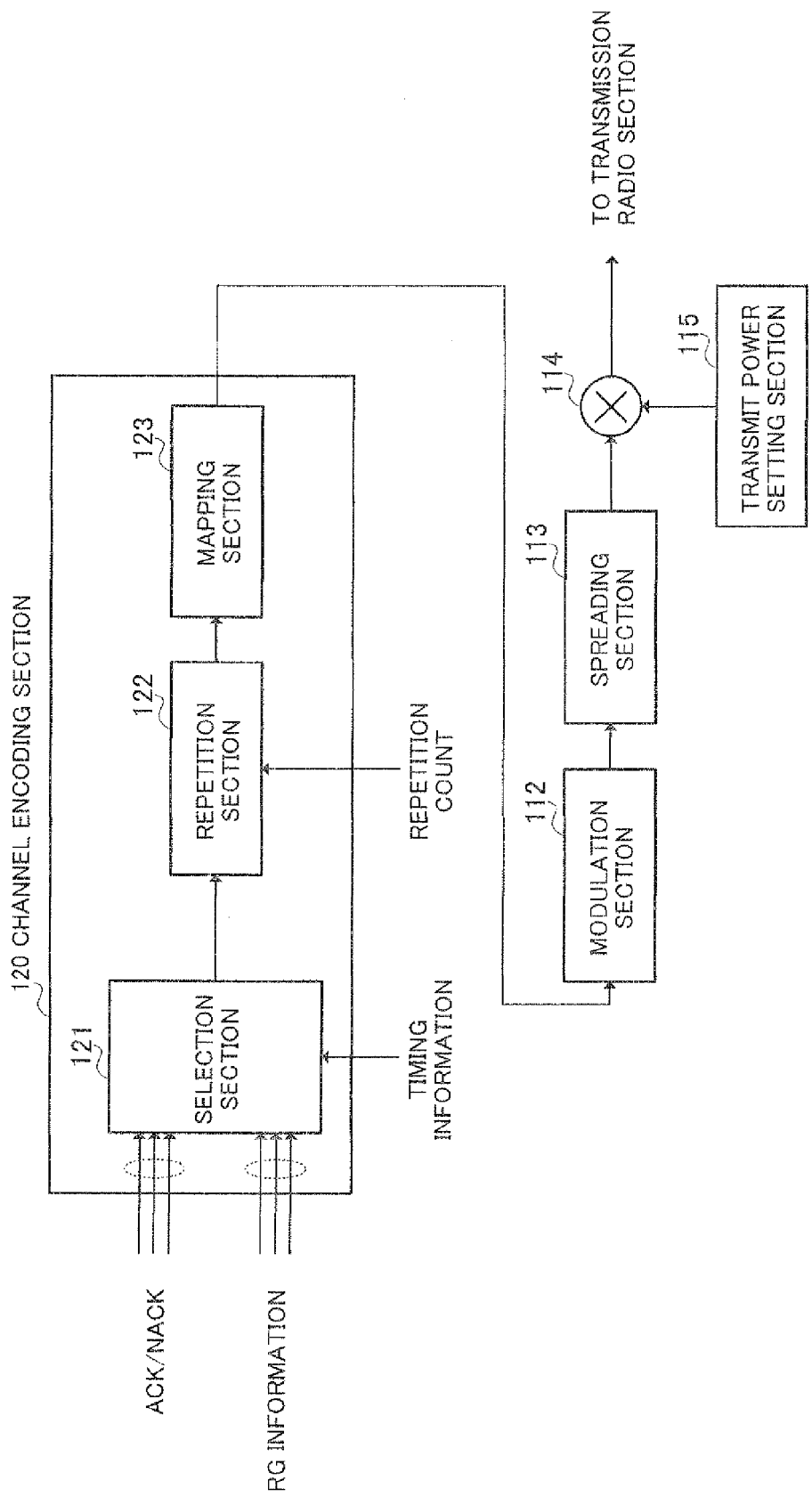
FIG. 10 is a block diagram showing the configuration of a control information channel signal formation unit when the PICH data structure is diverted.

FIG. 10 shows a specific configuration example of the control information channel signal formation unit 110 when the PICH data structure is diverted to time-division multiplex control information directed to a plurality of communication terminals on an uplink transmission packet signal. Actually, the channel encoding section 111 of the control information channel signal formation unit 110 shown in FIG. 4 can be constructed as the channel encoding section 120 in FIG. 10.

The channel encoding section 120 inputs ACK/NACK and RG information directed to each communication terminal to a selection section 121. The selection section 121 outputs this information sequentially at timings according to timing information predetermined between the base station apparatus and the communication terminal.

A repetition section 122 outputs input data repeatedly as many times as a predetermined repetition count. This repetition count is determined by the number of paging indicators Np as described above, and the process is repeated as many times as the number of bits to be stored in one paging indicator. For example, when the number of paging indicators Np is 18, the process is repeated 16 times and when Np is 144, the process is repeated two times.

The control information subjected to the repetition processing is sent to a mapping section 123. The mapping section 123 performs mapping to transmission bits according to the control information. For example, mapping is performed to −1 when the control information is 1, and to +1 when the control information is 0 (that is, the polarity of the transmission bit is changed according to the content of the control information). Thus, it is possible to time-division multiplex the control information directed to a plurality of communication terminals on the uplink transmission packet signals using the same data structure as the existing PICH data structure. When three values should be transmitted, "no transmission" can be used.

Figure 11:
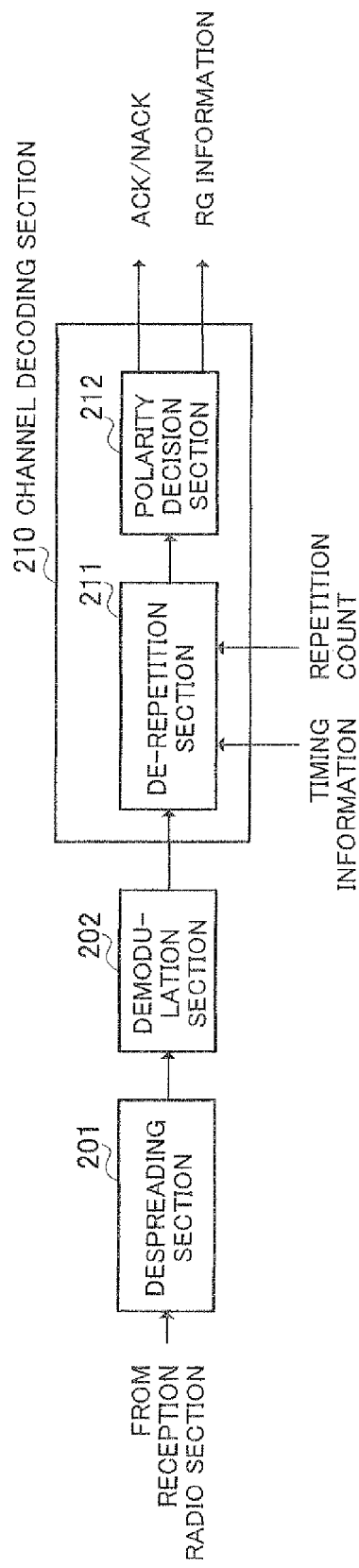
FIG. 11 is a block diagram showing the configuration of a channel decoding section when the PICH data structure is diverted.

FIG. 11 shows the configuration of a channel decoding section 210 that decodes the data formed by the channel encoding section 120 in FIG. 10. Actually, the channel decoding section 203 shown in FIG. 5 can be constructed as the channel decoding section 210 in FIG. 11.

The channel decoding section 210 inputs a demodulated signal to a de-repetition section 211. The de-repetition section 211 extracts the paging indicator directed to the own station from among time-division multiplexed paging indicators directed to a plurality of terminals based on the timing information. The de-repetition section 211 also combines bits repeated in the paging indicator based on the repetition count into one bit and outputs the combined bit. The output of the de-repetition section 211 is output to a polarity decision section 212. The polarity decision section 212 decides the polarity of the bit output from the de-repetition section 211 and thereby detects the contents of the control information (RG information and ACK/NACK).

By so doing, it is also possible to transmit control information directed to the plurality of terminals in addition to paging prediction signal using the existing PICH data structure. In order for the communication terminal to identify a paging prediction signal and the control information directed to the plurality of terminals, it is also possible to change, for example, a spreading code or for the system to determine the times at which the respective signals are transmitted.

Embodiment 2

This embodiment proposes that spreading codes are changed according to the type of control information taking into consideration the fact that transmitting control information directed to a plurality of communication terminals by diverting the PICH data structure as in the case of Embodiment 1 produces limits to the number of transmittable control information pieces and the number of communication terminals.

For example, as shown in FIG. 9, in a system with the number of paging indicators Np in one frame set to Np=144, there are 144 combinations of communication terminals and control information pieces that can be transmitted in one frame, while in a system with Np=18, the repetition count of bits in a paging indicator increases, and therefore only 18 combinations between communication terminals and control information pieces that can be transmitted in one frame can be secured. Focused on the fact that the number of transmittable control information pieces or the number of communication terminals decreases extremely depending on the number of paging indicators Np, this embodiment designs a configuration that increases the number of transmittable control information pieces and communication terminals even when a PICH data structure is used.

Figure 12:
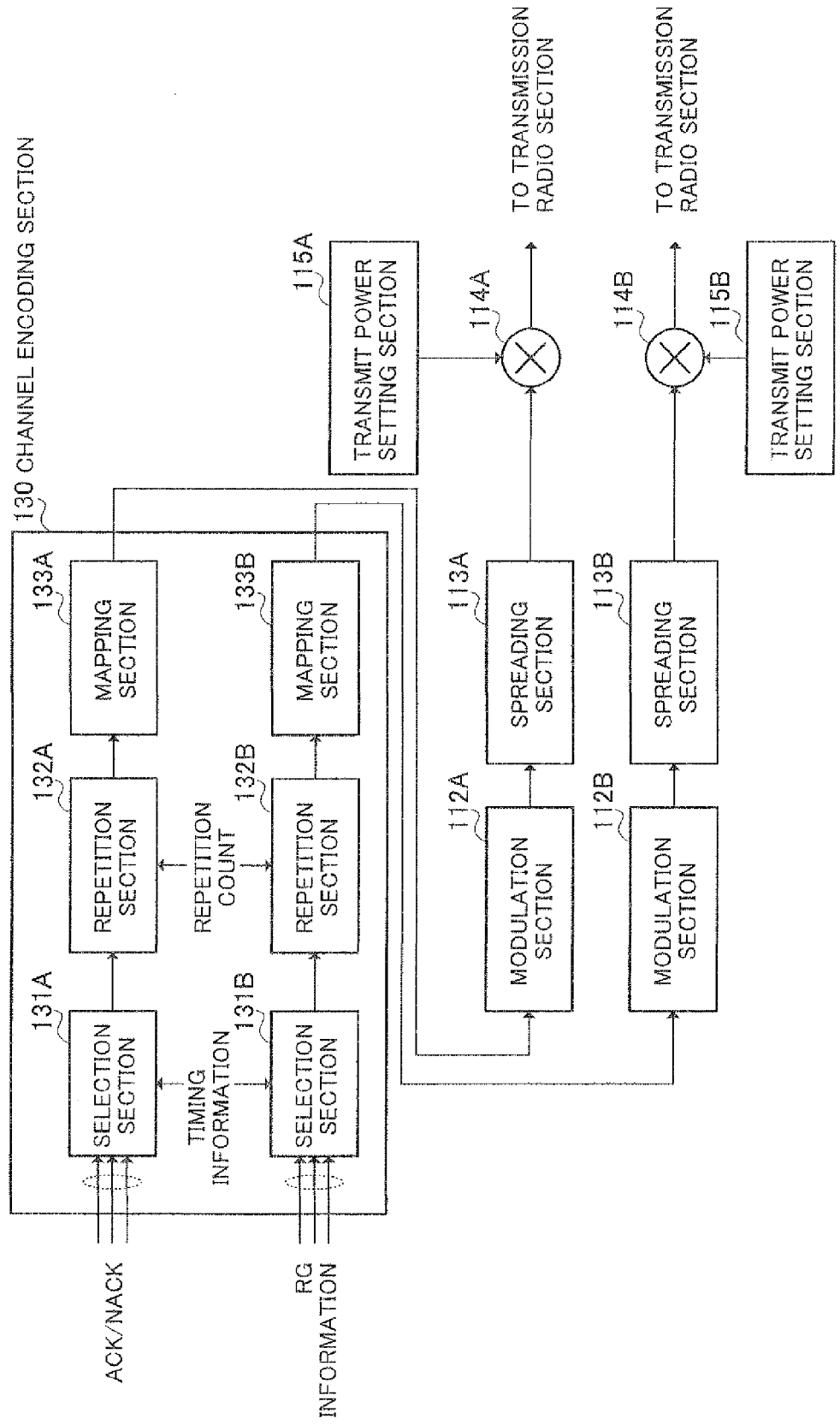
FIG. 12 is a block diagram showing the configuration of a control information channel signal formation unit of Embodiment 2.

FIG. 12 shows the configuration of a control information channel signal formation unit according to this embodiment. That is, the control information channel signal formation unit 110 shown in FIG. 4 is constructed as shown in FIG. 12. The control information channel signal formation unit shown in FIG. 12 is designed to form a control information channel signal according to the type of control information. In the case of this embodiment, there are two types of control information to be transmitted; ACK/NACK and RG information, and therefore two channel processing systems are provided.

More specifically, ACK/NACKs directed to a plurality of terminals is input to a selection section 131A of a channel encoding section 130 and RG information directed to the plurality of terminals is input to a selection section 131B. The selection sections 131A, 131B output ACK/NACK and RG information directed to the respective communication terminals sequentially at timings according to timing information. The ACK/NACK and RG information output from the selection sections 131A, 131B are repeatedly output by the repetition sections 132A, 132B according to the number of repetitions. The mapping sections 133A, 133B carry out mapping processing according to the contents of the repeatedly output ACK/NACK and RG information (more specifically, the polarity of the output bit is changed according to the contents), and thereby form and output a PICH bit.

In this way, two lines of PICH bits are formed by the channel encoding section 130. The PICH bits of the respective lines are modulated by modulation sections 112A, 112B respectively and spread by spreading section 113A, 113B using different spreading codes. The spreading code used by the spreading section 113A here is a spreading code common in the cell and the spreading code used by the spreading section 113B is different from the spreading code used by the spreading section 113A but common in the cell. These spreading codes are recognized by communication terminals in the cell.

The spread signals output from the spreading sections 113A, 113B are amplified by amplification sections 114A, 114B whose amplification factors are controlled by transmit power setting sections 115A, 115B respectively and then output to a transmission radio section.

Figure 13:
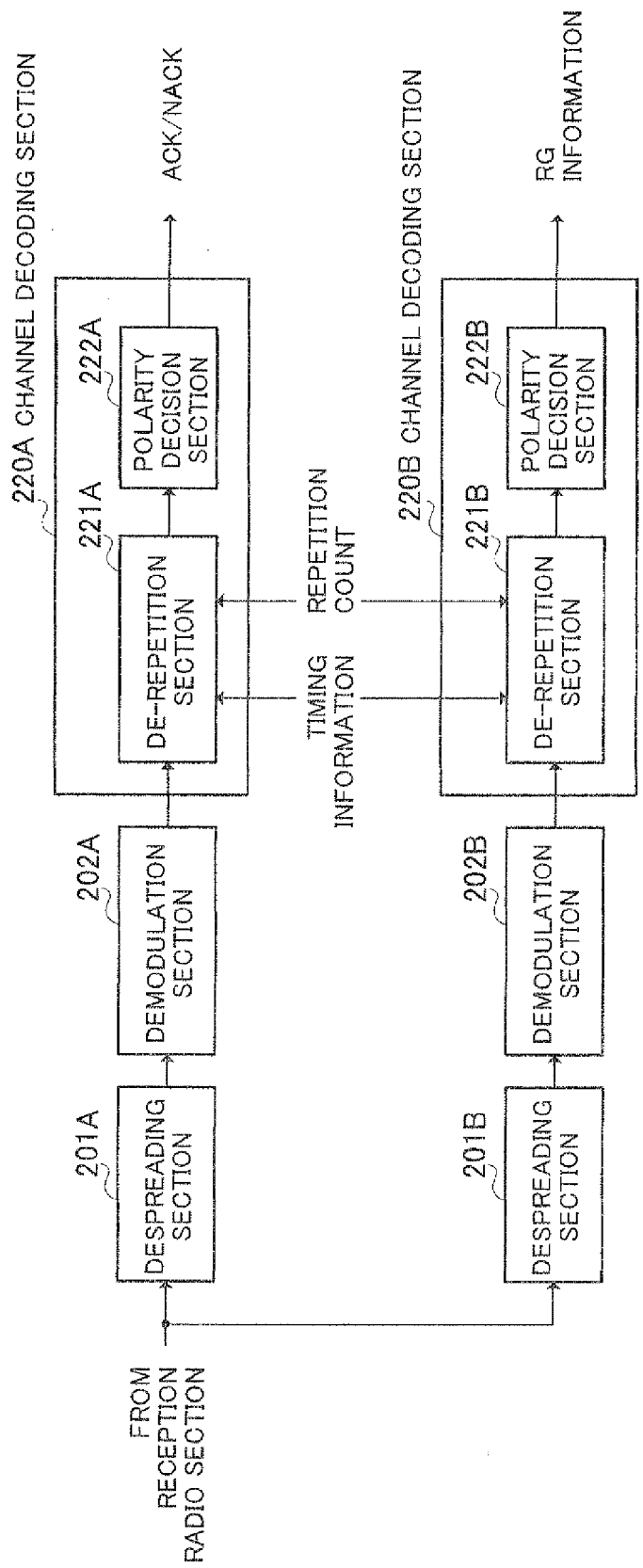
FIG. 13 is a block diagram showing characteristic parts of the reception system of a communication terminal apparatus of Embodiment 2.

The signal formed by the control information channel signal formation unit in FIG. 12 is received by a communication terminal apparatus having the configuration shown in FIG. 13. FIG. 13 only shows characteristic parts of the reception system provided for the communication terminal of this embodiment and these parts correspond to the despreading section 201, demodulation section 202 and channel decoding section 203 in FIG. 5.

The signal output from the reception radio section 42 (FIG. 5) are input to despreading sections 201A, 201B. The despreading sections 201A, 201B despread the received baseband signal using the same spreading codes used by the spreading section 113A, 113B respectively (FIG. 12). In this way, two lines of PICH signals are separated from the received baseband signal. The respective PICH signals are demodulated by demodulation sections 202A, 202B and sent to channel decoding sections 220A, 220B respectively.

The channel decoding sections 220A, 220B extract paging indicators directed to the own station according to timing information from the PICH signals through de-repetition sections 221A, 221B respectively and further apply de-repetition processing according to the repletion count. Polarity decision sections 222A, 222B decide the polarities of the signals after the de-repetition processing (that is, applies demapping processing) to thereby reconstruct the ACK/NACK and RG information.

Thus, this embodiment forms a PICH signal for each type of control information, spreads a number of PICH signals corresponding to the type of control information using spreading codes which are different but common in the cell and sends the spread signals to a plurality of communication terminals in the cell, and can thereby increase the number of transmittable control information pieces or the number of communication terminals even when a PICH data structure is used. In the case of this embodiment, it is possible to increase the number of transmittable control information pieces or the number of communication terminals twofold.

This embodiment has explained the case where since two types of control information; ACK/NACK and RG information are transmitted to each communication terminal, two lines of PICH signals accommodating these control signals are formed, spread using two spreading codes which are common in the cell and transmitted. However, in the case of, for example, three types of control information, it is possible to form three lines of PICH signals accommodating the respective control signals, spread the PICH signals using three spreading codes which are common in the cell and transmit the spread signals. Furthermore, when the number of control information bits of one communication terminal is N and the number of spreading codes common in the cell used is M, it is possible to divide the control signals into portions of N/M bits each and send them using their respective spreading codes.

Figure 14:
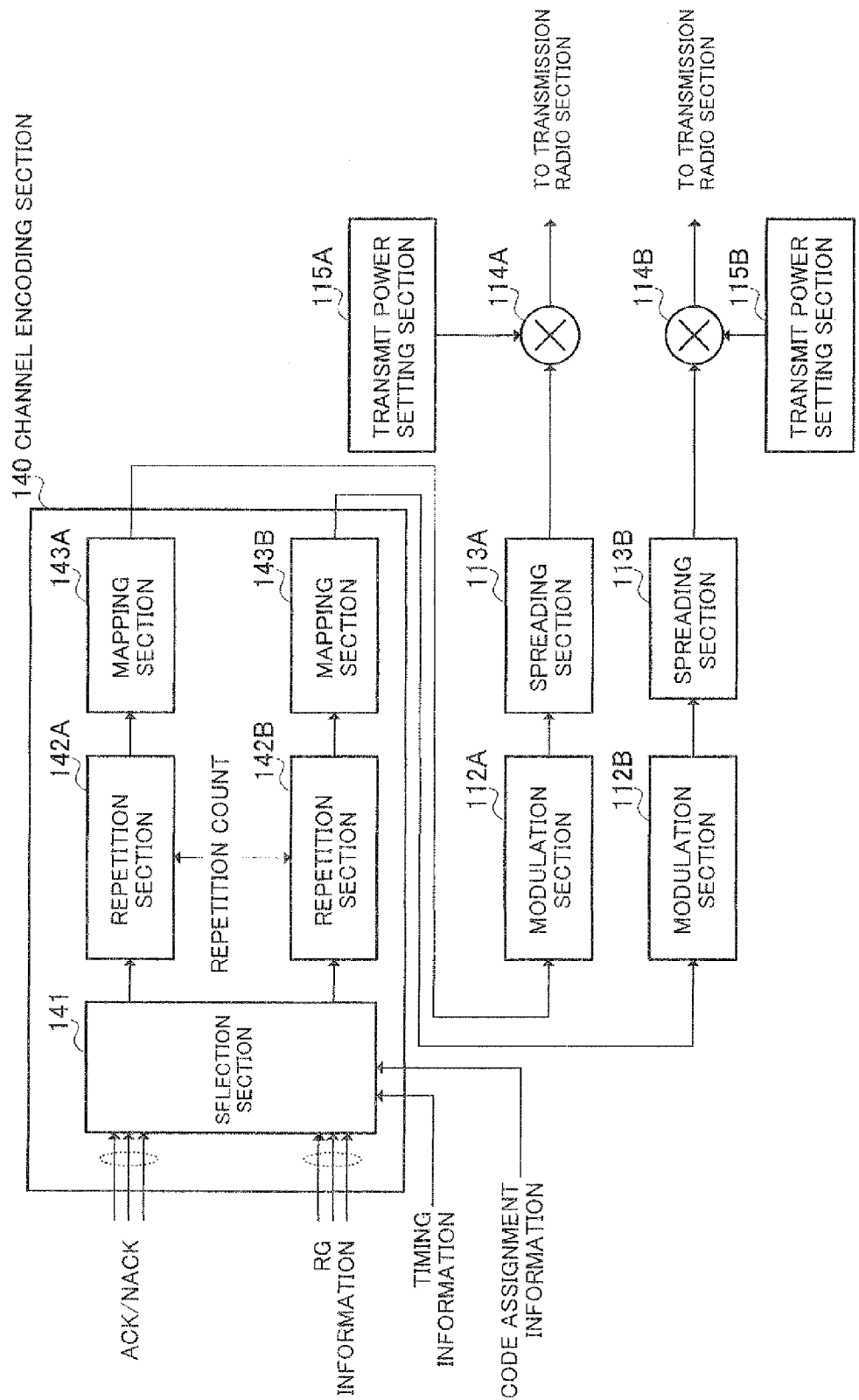
FIG. 14 is a block diagram showing another configuration of the control information channel signal formation unit of Embodiment 2.

Furthermore, this embodiment has explained the case where a number of PICH signals corresponding to the type of control information are formed and spread using spreading codes which are different but common in the cell, but the present invention is not limited to this and it is also possible to increase the number of transmittable control information pieces or the number of communication terminals using the configuration shown in FIG. 14.

In FIG. 14 in which the components corresponding to those in FIG. 12 are assigned the same reference numerals, a selection section 141 in a channel encoding section 140 selects and outputs input ACK/NACK and RG information directed to a plurality of terminals based on timing information and code assignment information.

In the configuration in FIG. 14 here, when, for example, there are 20 communication terminals in the cell to which control information should be transmitted, a first spreading code is used for 10 communication terminals which is common to these terminals and a second spreading code is used for the remaining 10 communication terminals which is common to these terminals. That is, a plurality of communication terminals in the cell is grouped according to spreading codes and PICH signals are formed group by group.

That is, the selection section 141 divides ACK/NACK and RG information directed to each communication terminal into two lines based on the code assignment information. Furthermore, for the signal of each line, ACK/NACK and RG information directed to the communication terminals in a group are time-division multiplexed based on the timing information and output.

The control information of the respective lines is subjected to repetition processing by repetition sections 142A, 142B and mapped by mapping sections 143A, 143B and thereby output from the channel encoding section 140 as PICH signals.

Thus, according to the configuration in FIG. 14, a plurality of communication terminals in the cell is grouped according to spreading codes and a PICH signal for transmitting control information is formed group by group, and it is thereby possible to increase the number of transmittable control information pieces or the number of communication terminals even when a PICH data structure is used as in the case of the aforementioned embodiment. In this case, the number of groups is not limited to 2, either.

Embodiment 3

This embodiment proposes a method of transmitting to communication terminals control information on uplink packet transmission multiplexed using signatures. More specifically, this is a method of providing a plurality of symbol patterns which is multiplexed but still separable (that is, mutually uncorrelated or quasi-uncorrelated), assigning one or a plurality of symbol patterns to one communication terminal and changing polarities of the symbol patterns according to the contents of control information to be transmitted.

Figure 15:
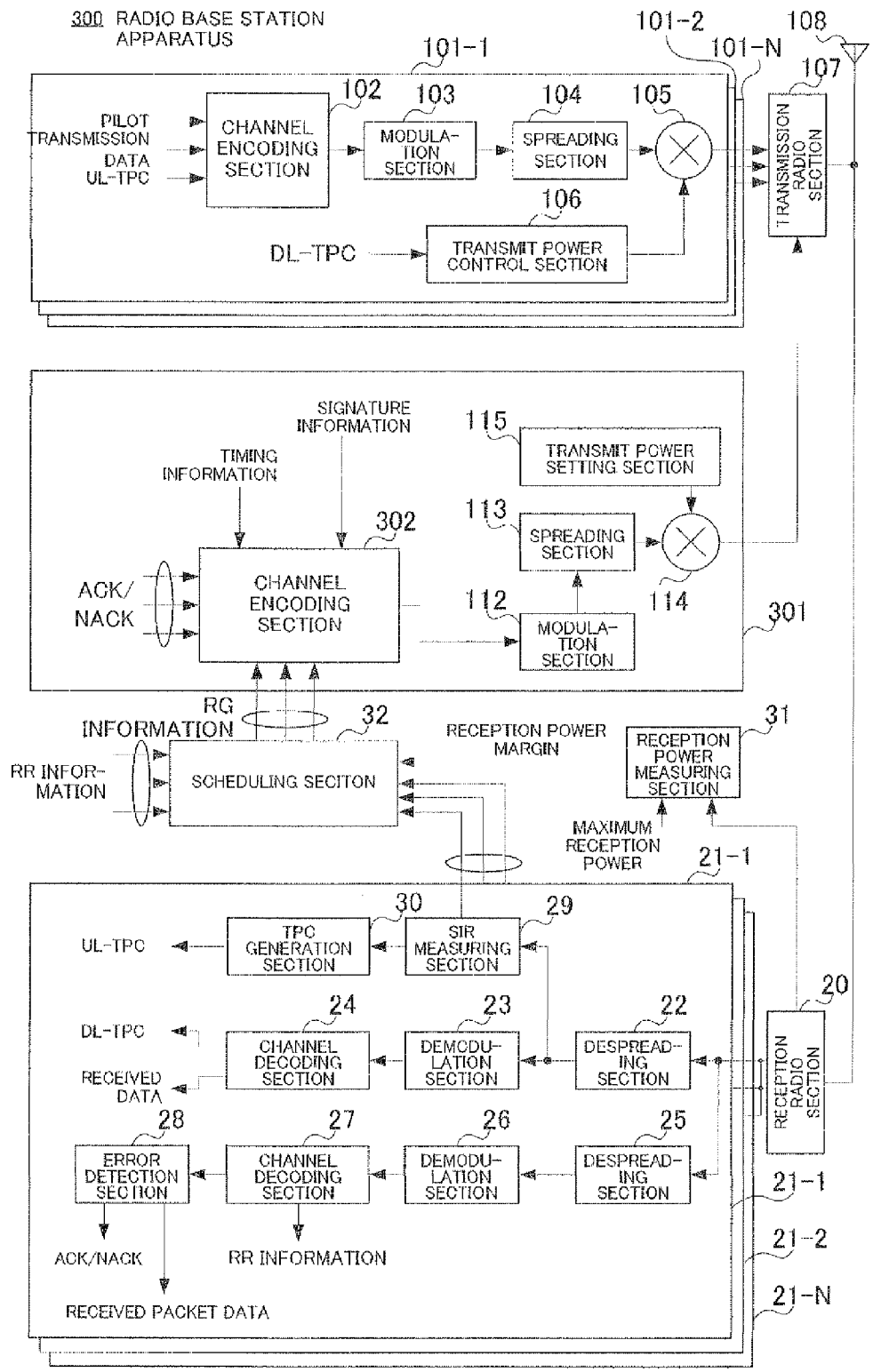
FIG. 15 is a block diagram showing the configuration of a radio base station apparatus of Embodiment 3.

FIG. 15 in which the components corresponding to those in FIG. 4 are assigned the same reference numerals shows the configuration of a radio base station apparatus according to Embodiment 3 of the present invention. The radio base station apparatus 300 has a configuration similar to that of the radio base station apparatus 100 in Embodiment 1 except that signature information is input to a channel encoding section 302 and control information of an uplink transmission packet directed to each communication terminal is multiplexed using signatures.

Figure 16:
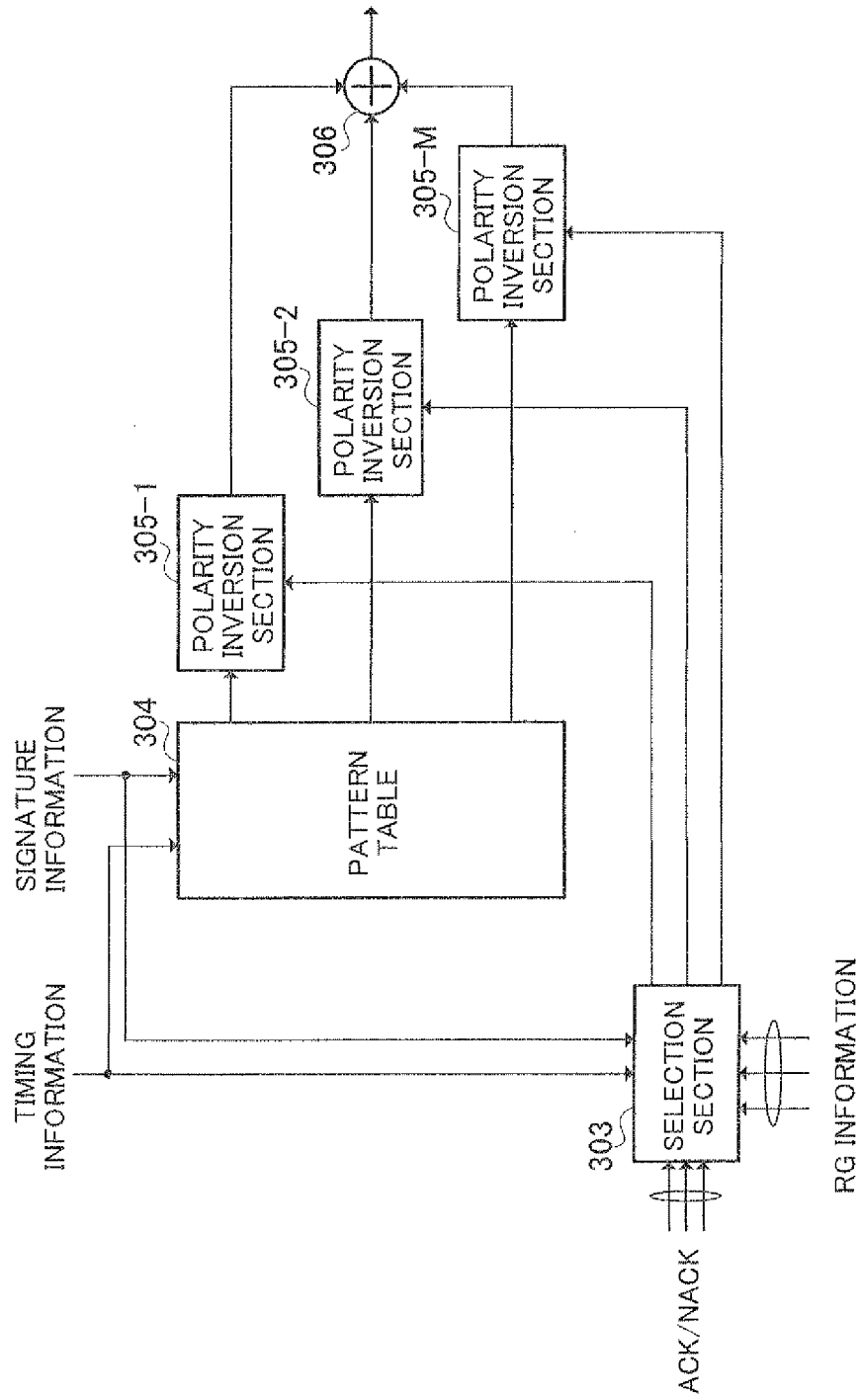
FIG. 16 is a block diagram showing the configuration of a channel encoding section of Embodiment 3.

The channel encoding section 302 is constructed as shown in FIG. 16. The channel encoding section 302 inputs RG information and ACK/NACK directed to each communication terminal to a selection section 303. The selection section 303 outputs information corresponding to the signature information from the input information at a timing based on timing information.

The channel encoding section 302 also includes a pattern table 304. The pattern table 304 stores a plurality of symbol patterns which have mutually 0 correlations and the pattern table 304 outputs a plurality of symbol patterns corresponding to the signature information at a timing based on the timing information. In the example in FIG. 16, the contents of the pattern table 304 are rewritable with the signature information.

Each symbol pattern output from the pattern table 304 is input to polarity inversion sections 305-1 to 305-M. The polarity inversion sections 305-1 to 305-M invert the polarities of the input symbol patterns according to the control information (RG information and ACK/NACK) from the selection section 303 or output the symbol patterns with the same polarities or output nothing.

For example, when the RG information has contents instructing an increase of the transmission rate, the polarity inversion sections 305-1 to 305-M output symbol patterns without inverting their polarities, whereas when the RG information has contents instructing a decrease of the transmission rate, the polarity inversion sections 305-1 to 305-M output symbol patterns with their polarities inverted. Furthermore, when the contents instruct that the transmission rate should be kept, the polarity inversion sections 305-1 to 305-M output nothing. The outputs from the polarity inversion sections 305-1 to 305-M are multiplexed by a multiplexing section 306 and sent to a modulation section 112 (FIG. 15).

Which control signal directed to which communication terminal should be selected by the selection section 303 at which timing is determined according to a rule predetermined between the base station apparatus and each communication terminal. Furthermore, which communication terminal should be assigned to which symbol pattern output from the pattern table 304 and which control information (RG information or ACK/NACK) is assigned is also determined according to the rule predetermined between the base station apparatus and the communication terminal.

Figure 5:
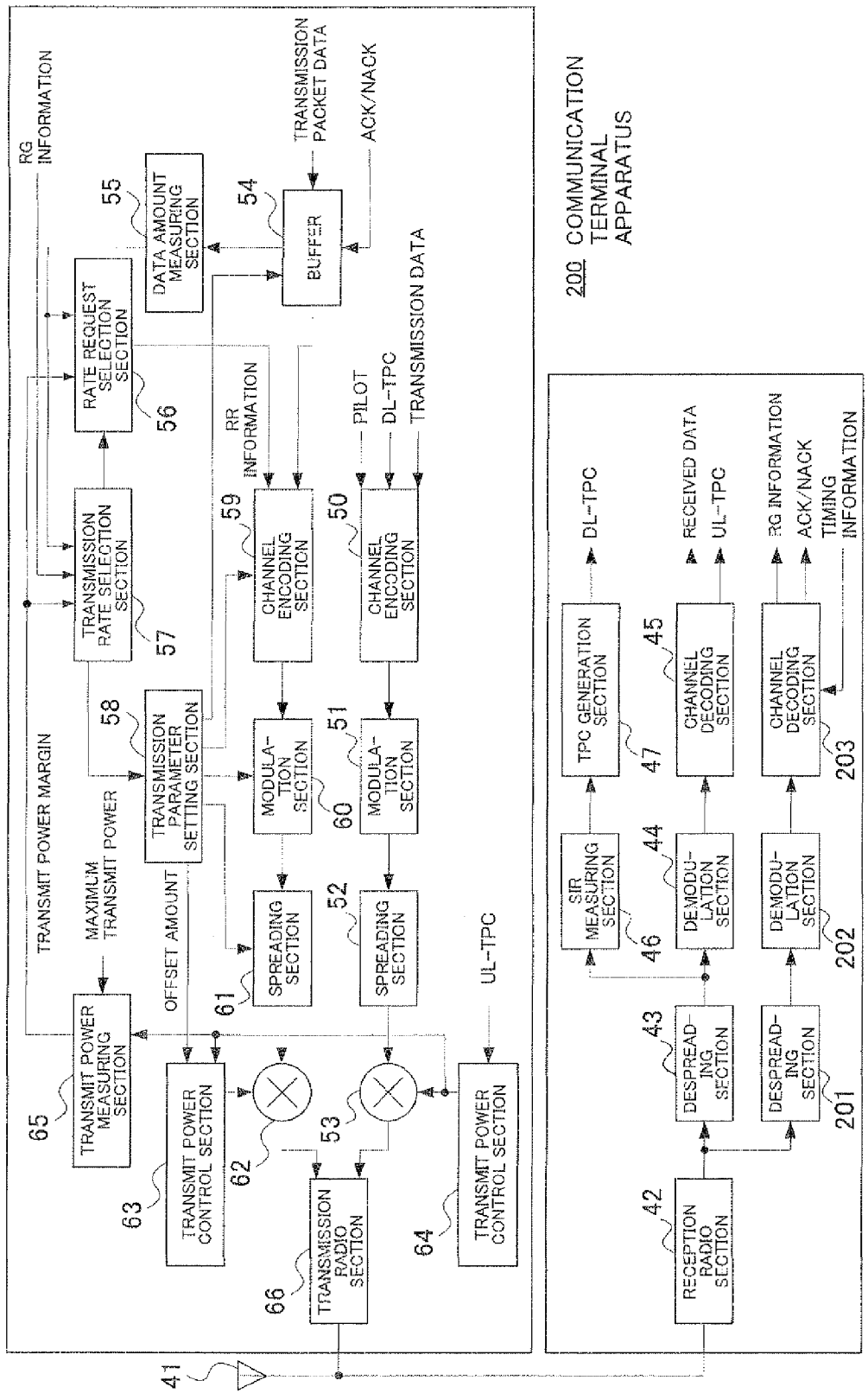
FIG. 5 is a block diagram showing the configuration of a communication terminal apparatus of Embodiment 1.
Figure 17:
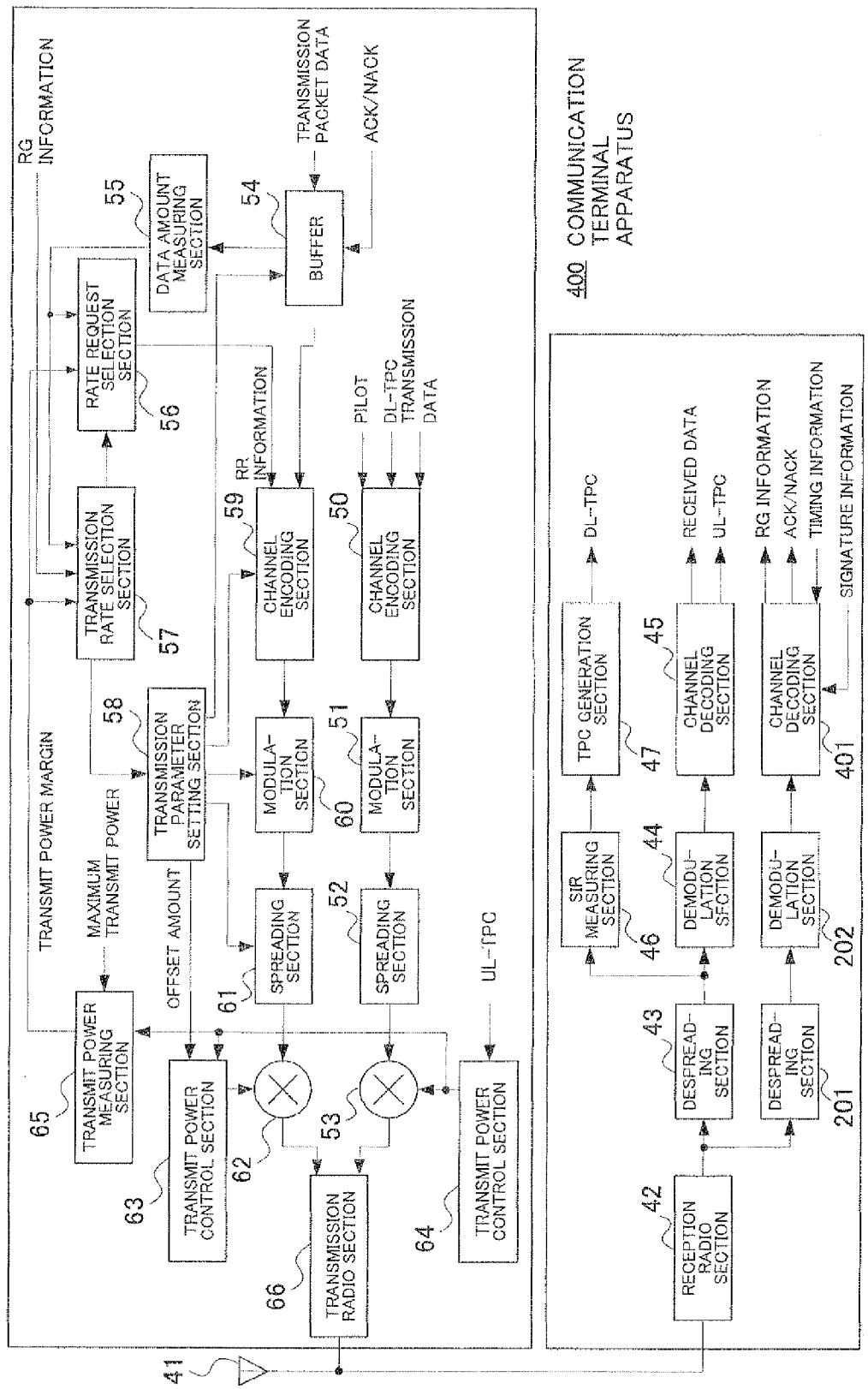
FIG. 17 is a block diagram showing the configuration of a communication terminal apparatus of Embodiment 3.

Next, using FIG. 17 in which the components corresponding to those in FIG. 5 are assigned the same reference numerals, the configuration of the communication terminal apparatus which communicates with the radio base station apparatus 300 will be explained. Except that the configuration of a channel decoding section 401 is different, this communication terminal apparatus 400 has a configuration similar to that of the communication terminal apparatus 200 of Embodiment 1. The channel decoding section 401 is designed to extract control information directed to the own station out of control information directed to a plurality of communication terminals multiplexed on the control information channel based on signature information and timing information.

Figure 18:
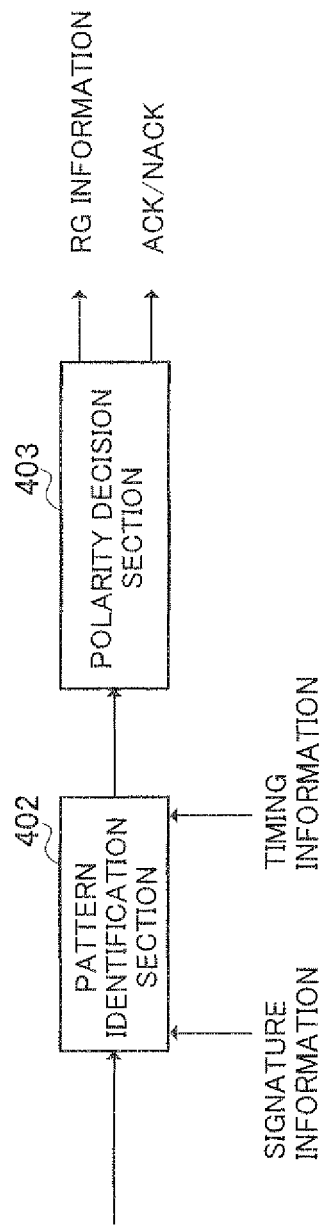
FIG. 18 is a block diagram showing the configuration of a channel decoding section of Embodiment 3.

FIG. 18 shows the configuration of the channel decoding section 401. The channel decoding section 401 inputs a demodulated signal of the control information channel to a pattern identification section 402. The pattern identification section 402 finds a correlation between the demodulated signal and symbol pattern specific to the own station based on the signature information (preset information indicating the symbol pattern specific to the own station) to thereby identify and extract the symbol pattern directed to the own station from among the multiplexed symbol patterns directed to various communication terminals.

Next, the channel decoding section 401 decides the polarity of the extracted symbol pattern through a polarity decision section 403 to detect the contents of RG information and ACK/NACK. With respect to the RG information, for example, the polarity decision section 403 outputs RG information indicating that the transmission rate should be increased if the polarity of the symbol pattern is positive, that the transmission rate should be decreased if the polarity is negative, and that the transmission rate should be kept if the correlation result is 0 or equal to or lower than a certain level.

Next, the operations of the radio base station apparatus 300 and communication terminal apparatus 400 of this embodiment will be explained using FIG. 19. As in the case of the radio base station apparatus 100 of Embodiment 1, the radio base station apparatus 300 sends transmission data directed to each communication terminal through a dedicated channel, while the radio base station apparatus 300 sends control information directed to each communication terminal (e.g., RG information, ACK/NACK) for each communication terminal to carry out uplink packet transmission using a dedicated channel through a control information channel (downlink control information channel).

In this case, the radio base station apparatus 300 multiplexes control signals directed to communication terminals to which data is transmitted at least at the same time with mutually uncorrelated symbol patterns assigned thereto. At this time, the radio base station apparatus 300 changes the polarity of the symbol pattern according to the contents of control information directed to each communication terminal.

Figure 19:
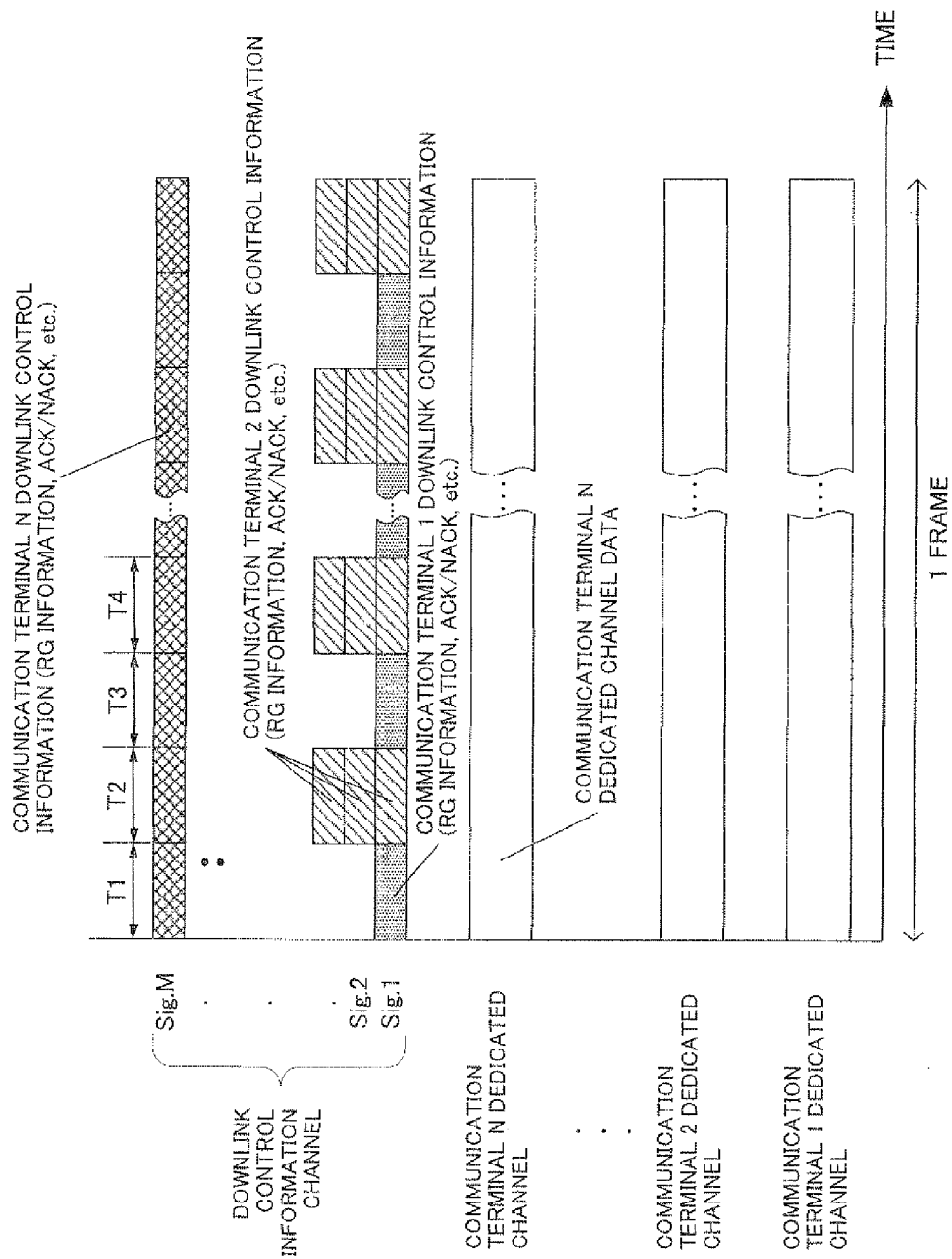
FIG. 19 is a frame block diagram of each channel for illustrating the operation of Embodiment 3.

In the example shown in FIG. 19, at time T1, symbol pattern 1 (Sig.1) is assigned to communication terminal 1 and at the same time symbol pattern M (Sig.M) is assigned to communication terminal N and these symbol patterns are multiplexed with their polarities changed according to the control information to be transmitted. Furthermore, at time T2, symbol pattern 1 (Sig.1), symbol pattern 2 (Sig.2) and symbol pattern 3 (Sig.3) are assigned to communication terminal 2 and symbol pattern M (Sig.M) is assigned to communication terminal N and these symbol patterns are multiplexed with their polarities changed according to the control information to be transmitted.

Since the communication terminal which receives this signal is designed to be able to know that symbol patterns 1, 2, 3 are assigned to communication terminal 2 at, for example, time T2 from the timing information and signature information, it is possible to extract only control information directed to the own station.

As a result, control information directed to all communication terminals is transmitted using one control information channel as with Embodiment 1, and therefore it is possible to transmit control information for the communication terminals to perform uplink packet transmission using dedicated channels without changing the standardization specification of downlink dedicated channels.

In addition, providing a plurality of symbol patterns, assigning one or a plurality of symbol patterns to one communication terminal and changing polarities of the symbol patterns according to the contents of control information to be sent and thereby multiplexing control information directed to each communication terminal eliminates the need for adding identification information for extracting signals directed to the own station from the multiplexed signal and avoid an increase of overhead.

Thus, this embodiment multiplexes control information for each communication terminal to perform uplink packet transmission using dedicated channels using symbol patterns predetermined between the base station apparatus and the respective communication terminals and spreads the control information using a spreading code common to the communication terminals, and can thereby realize the radio base station apparatus 300 capable of transmitting the control information to all communication terminals carrying out uplink packet transmission without transmitting numbers for identifying communication terminals or changing dedicated channels.

This embodiment has described the case where control information for uplink packet transmission is multiplexed on a control information channel using not only signatures but also timing, but this embodiment may also be adapted so as to perform multiplexing using only signatures. For example, if symbol pattern 1 is assigned to communication terminal 1, symbol pattern 2 is assigned to communication terminal 2, . . . , symbol pattern 3 is assigned to communication terminal N all the time, that is, if time-division multiplexing processing is not performed, it is possible for each communication terminal to extract control information directed to the own station without timing information.

However, as shown in FIG. 19, if timing as well as signature is used, it is possible to perform control requiring a plurality of bits (e.g., high accuracy rate control using a plurality of bits, or both rate control and control of ACK/NACK) simultaneously. The communication terminal 2 corresponds to this in the figure.

In addition, this embodiment proposes the use of an existing AICH (Acquisition Indication Channel) data structure as one of preferable methods for transmitting control information on uplink packet transmission directed to a plurality of terminals multiplexed using signatures. The method of multiplexing control information using the AICH will be explained below.

Figure 20:
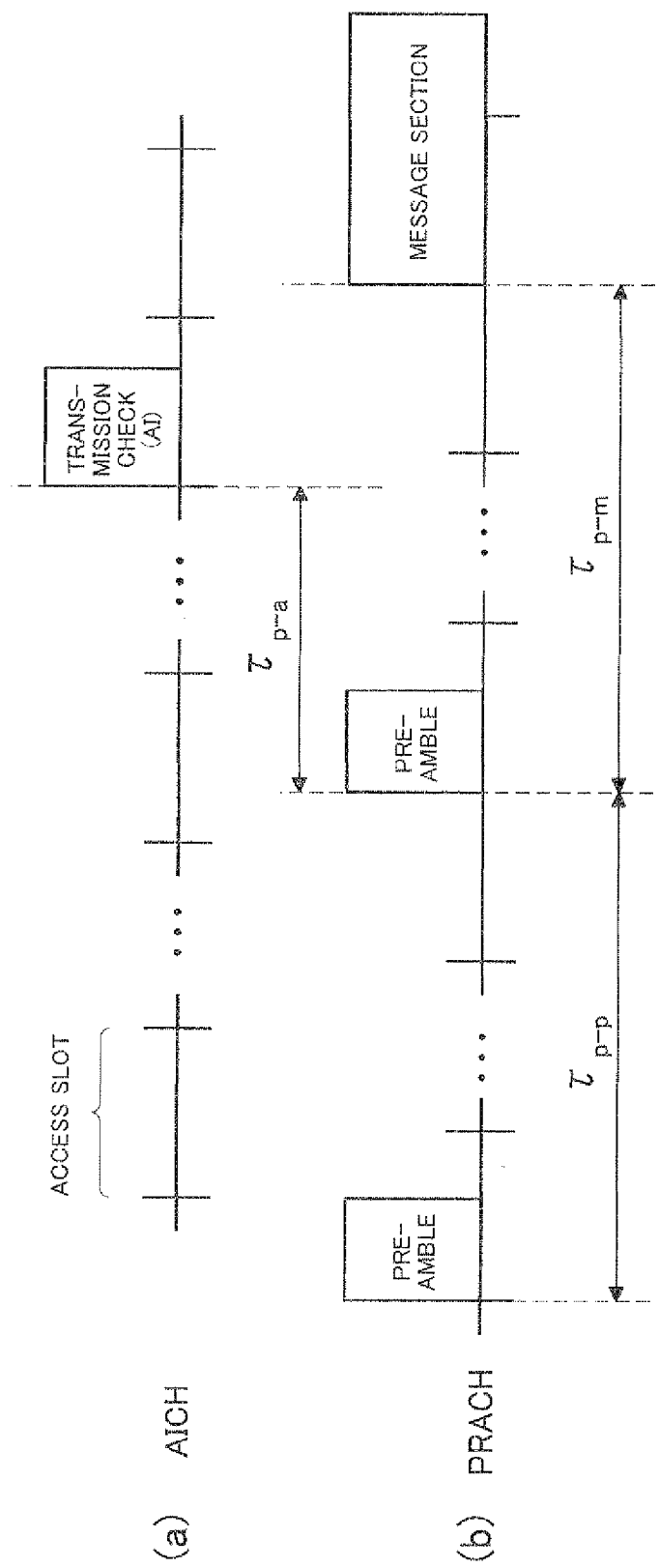
FIG. 20 illustrates a timing relationship between PRACH and AICH.

First, a general AICH will be explained. The AICH is sent from a base station in response to a preamble sent from a communication terminal through a PRACH (Physical Random Access Channel). FIG. 20 shows a timing relationship between PRACH and AICH viewed from a communication terminal. The communication terminal transmits preambles at intervals of $\tau_{p-p}$. The base station which has detected a preamble sends an acquisition indicator as a response to the detected preamble. The time interval between the preamble and acquisition indicator is $\tau_{p-a}$. The communication terminal which has received the acquisition indicator meaning permission for message transmission (ACK) sends a message at intervals of $\tau_{p-m}$ in response to the preamble.

The AICH sends an acquisition indicator at a fixed rate (spreading factor SF=256). As shown in FIG. 7, access slot #0 of the AICH starts simultaneously with a P-CCPCH frame which becomes (SFN modulo 2)=0. Access slots are repeated at 15 periods of #0 to #14.

Figure 21:
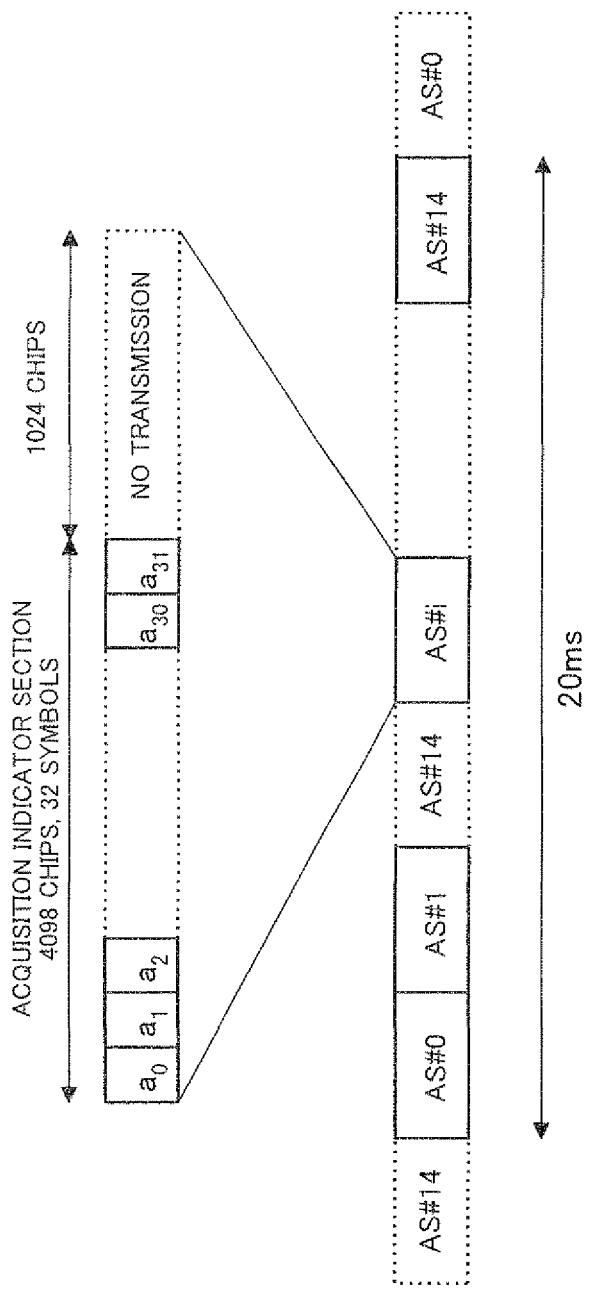
FIG. 21 illustrates the configuration of AICH.

FIG. 21 shows the configuration of the AICH. Each access slot (AS#0 to AS#14) consists of 5120 chips (=2 slots) and each access slot transmits an acquisition indicator expressed in 32 symbols with first 4096 chips and the remaining 1024 chips correspond to no transmission.

Figure 22:
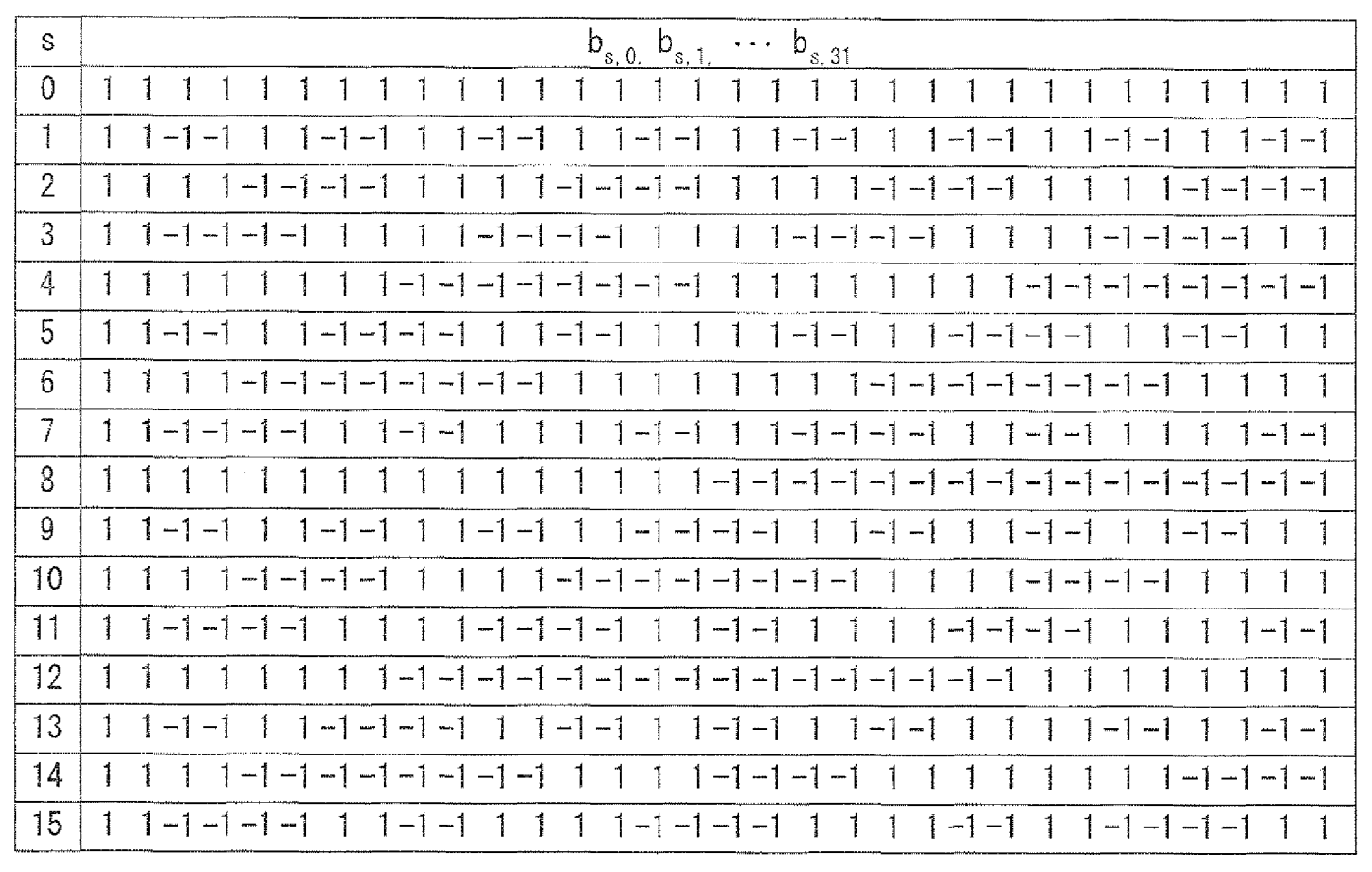

The acquisition indicator directed to each communication terminal is assigned one of a plurality of symbol patterns (16 types in the case of FIG. 22). For example, the symbol pattern of s=0 in the figure is assigned to a communication terminal and the symbol pattern of s=1 in the figure is assigned to another communication terminal.

The information in one acquisition indicator is actually obtained by multiplying 32 assigned symbol patterns $b_{s,0}$, $b_{s,31}$ by any one of three values +1/−1/0 according to the information to be transmitted. This makes it possible to transmit information of three values using polarities of symbol patterns.

For example, when a symbol pattern with signature number s=0 is assigned to a communication terminal to transmit information of +1, the symbol pattern is transmitted as is. On the other hand, to transmit information of −1, symbols are transmitted with polarities of all symbol patterns with signature number s=0 in the figure inverted. The same applies to a case where symbol patterns with other signature number s are assigned to other communication terminals.

This embodiment proposes the following three methods ①, ② and ③ as the method of transmitting control information on uplink packet transmission by diverting such an AICH data structure.

① One combination of an access slot (timing) and signature is assigned to only one communication terminal. This allows control for each communication terminal to be realized. Since the above described acquisition indicator can transmit three values of +1/−1/0, it is possible to perform mapping such as +1=up, −1=down, 0=keep, as rate control. Furthermore, when ACK/NACK of HARQ is transmitted, it is possible to perform mapping such as +1=ACK, −1=NACK.

② A plurality of access slots is assigned to one communication terminal. This allows control information to be transmitted to one communication terminal a plurality of times per frame, and can thereby realize high-speed control. Moreover, it is also possible to realize control requiring a plurality of bits (e.g., high accuracy rate control using a plurality of bits and both rate control and control of ACK/NACK).

③ A plurality of symbol patterns is assigned to one communication terminal. This allows control requiring a plurality of bits (e.g., high accuracy rate control using a plurality of bits and both rate control and control of ACK/NACK) to be performed simultaneously. The assignment for communication terminal 2 in the example in FIG. 19 corresponds to this.

Thus, diverting the existing AICH data structure and transmitting control information using the methods such as ① to ③ makes it possible to divert the AICH transmission circuit at the base station and AICH reception circuit at the communication terminal without adding downlink channels of a new data structure and suppress an increase in the circuit scales of the base station and communication terminal.

When the AICH data structure is diverted as in this embodiment, there are also limits to the number of transmittable control information pieces and the number of communication terminals as described in Embodiment 2. That is, these numbers are limited to combinations of the number of access slots and the number of signatures of the AICH.

With consideration given to this, carrying out similar processing to that explained in Embodiment 2 in the case where the AICH data structure is diverted is also effective in increasing the number of transmittable control information pieces and the number of communication terminals.

That is, by forming an AICH signal for each type of control information, spreading AICH signals corresponding to the types of control information and the total number of bits using spreading codes which are different but common in the cell and transmitting the AICH signals to a plurality of communication terminals in the cell, it possible to increase the number of transmittable control information pieces or the number of communication terminals even when the AICH data structure is used.

Furthermore, by grouping a plurality of communication terminals according to spreading codes and forming an AICH signal group by group, it is also possible to increase the number of transmittable control information pieces or the number of communication terminals even when the AICH data structure is used.

Embodiment 4

Figure 23:
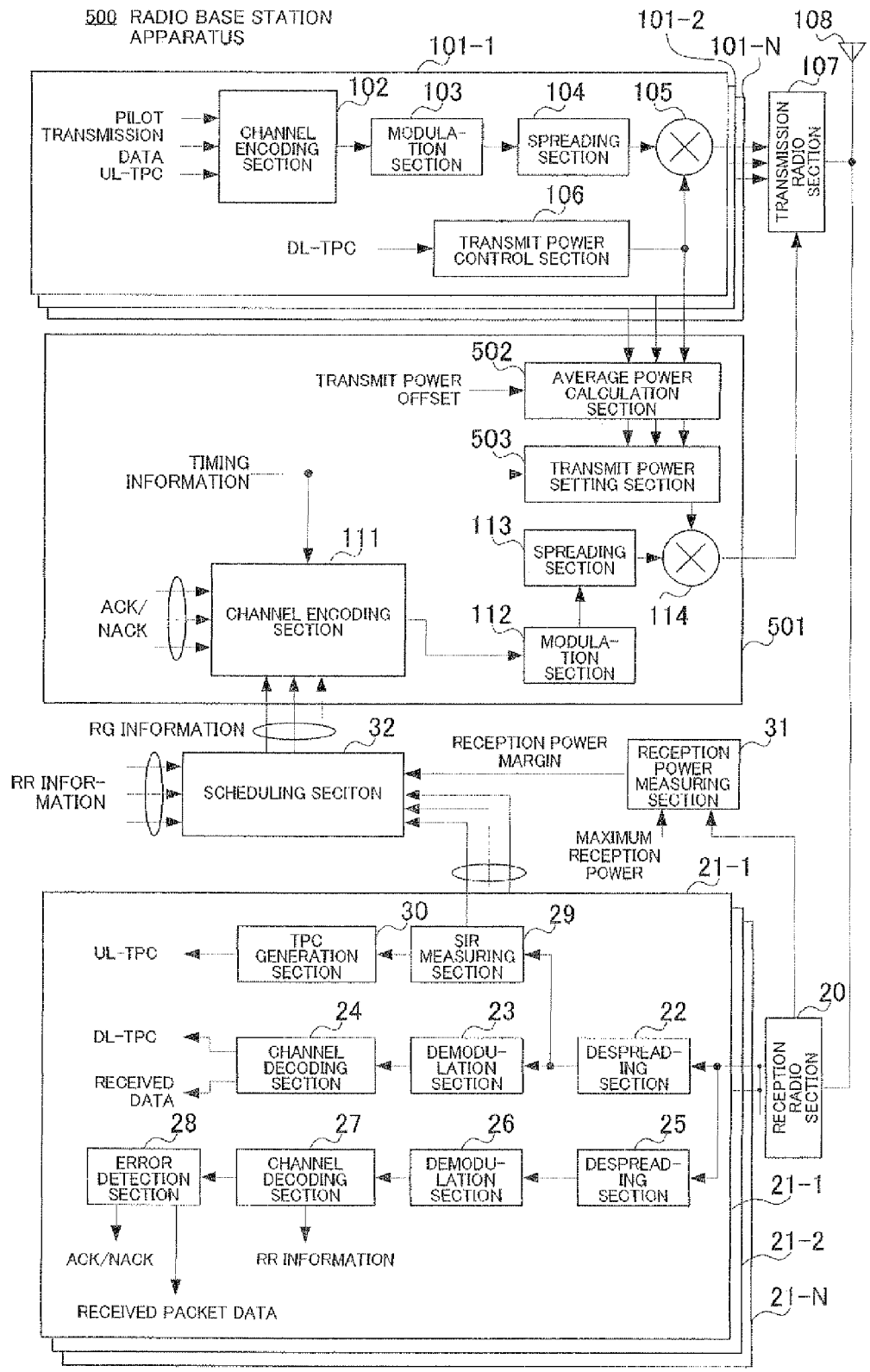
FIG. 23 illustrates the configuration of a radio base station apparatus of Embodiment 4.

FIG. 23 in which the components corresponding to those in FIG. 4 are assigned the same reference numerals shows the configuration of a radio base station apparatus according to Embodiment 4 of the present invention. A control information channel signal formation unit 501 of the radio base station apparatus 500 is provided with an average power calculation section 502.

The average power calculation section 502 calculates average transmit power for each dedicated channel based on transmit power control values from transmit power control sections 106 of dedicated channel signal formation units 101-1 to 101-N. For example, an average transmit power value within one frame is calculated for each dedicated channel. Then, the average power calculation section 502 gives an offset to the average transmit power value for each calculated dedicated channel and sends it to a transmit power setting section 503.

The transmit power setting section 503 selects the average transmit power value of any one channel from among average transmit power values of a plurality of dedicated channels input from the average power calculation section 502 according to timing information and sends a transmit power control signal having a value corresponding to this average transmit power value to an amplification section 114. This causes the transmit power value of the control signal directed to each communication terminal output from the control information channel signal formation unit 501 to have magnitude corresponding to the transmit power value of each dedicated channel.

Figure 24:
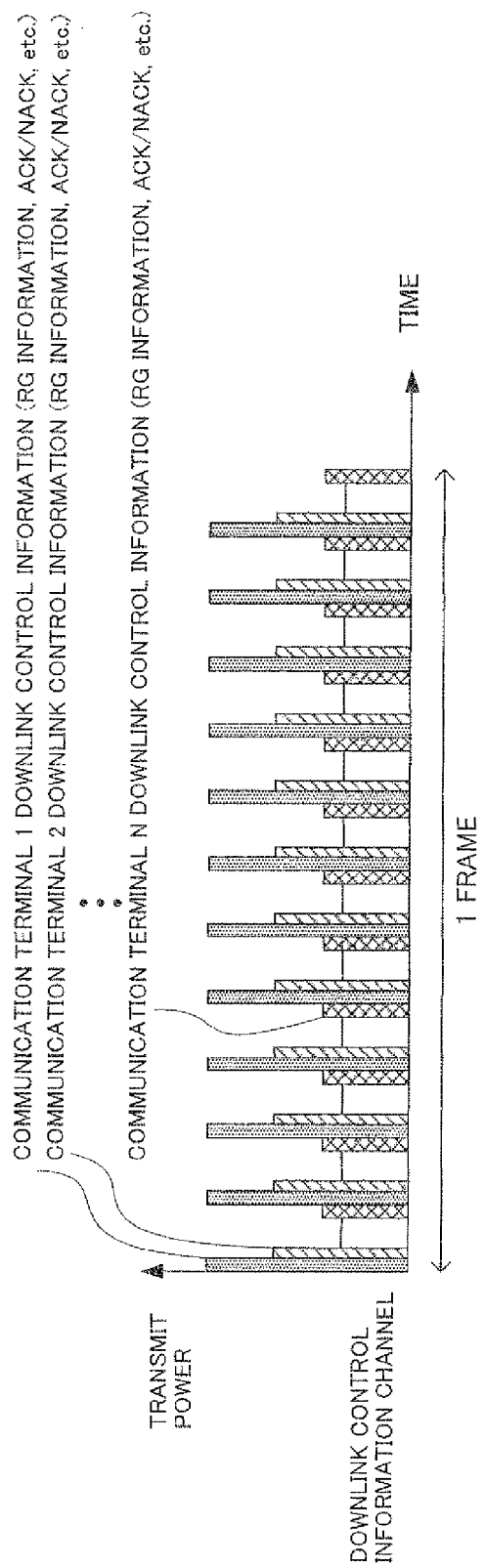
FIG. 24 illustrates transmit power of a control information channel signal transmitted from the radio base station apparatus of Embodiment 4.

FIG. 24 shows the control information channel signal (downlink control information channel) transmitted from the radio base station apparatus 500 of this embodiment. As described in Embodiment 1, control information directed to each communication terminal (e.g., RG information, ACK/NACK) is time-division multiplexed at a timing predetermined between the radio base station apparatus and each communication terminal apparatus so that each communication terminal can extract control information directed to the own station without identification information.

In addition, the magnitude of control information directed to each communication terminal is controlled so as to match the transmit power value at the dedicated channel directed to the corresponding communication terminal (however, provided with an offset). This control can be realized by the transmit power setting section 503 matching the amplification factor of the amplification section 114 with the average transmit power value of the dedicated channel of the communication terminal 1 based on the timing information when, for example, the control information directed to the communication terminal 1 is input to the amplification section 114.

Figure 25:
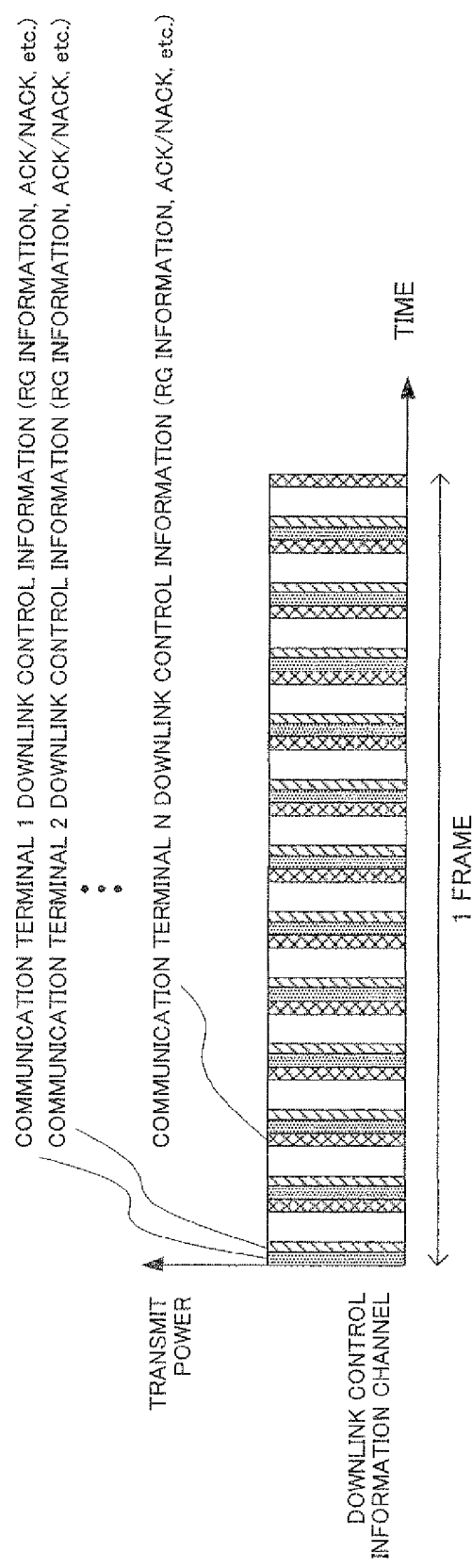
FIG. 25 illustrates a case where transmit power of a control information channel signal within 1 frame is fixed.

For comparison, FIG. 25 shows a state of transmit power of a control information channel signal (e.g., output signal from the control information channel signal formation unit 110 of the radio base station apparatus 100 of Embodiment 1) when transmit power control according to a dedicated channel is not performed for each control information piece directed to each communication terminal. As is evident from this figure, unless transmit power control according to this embodiment is performed, transmit power of a control signal directed to each communication terminal is fixed within 1 frame.

On the other hand, this embodiment controls transmit power of control signals directed to their respective communication terminals which are time-division multiplexed on a control information channel in accordance with the transmit power of the corresponding dedicated channel, and can thereby transmit the control signal directed to each communication terminal to the target communication terminal with high quality and improve reliability of uplink packet transmission. Furthermore, this embodiment can avoid the necessity for overconsuming resources of transmit power and use the saved transmit power resources for other channels.

Thus, in addition to the configuration of Embodiment 1, this embodiment controls transmit power of control signals directed to their respective communication terminals which are time-division multiplexed on a control information channel in accordance with the transmit power of the corresponding dedicated channel, and can thereby realize the radio base station apparatus 500 capable of improving reliability of a control signal directed to each communication terminal and improving the utilization efficiency of transmit power resources in addition to the effects of Embodiment 1.

This embodiment has described the case where transmit power of control information directed to each communication terminal time-division multiplexed as in the case of Embodiment 1 is controlled according to the transmit power of the dedicated channel signal directed to the corresponding communication terminal, but the present invention is not limited to this and it is also possible to attain effects similar to those in the above described embodiment by controlling transmit power of control information directed to the respective communication terminals multiplexed using signatures as shown in Embodiment 3 in accordance with the transmit power of the dedicated channel signal directed to the corresponding communication terminal. Furthermore, this embodiment averages transmit power of respective communication terminals, but it is also possible to use instantaneous transmit power instead of averaged transmit power.

Embodiment 5

This embodiment will describe an improvement in the method of setting timing information and signature information which need to be shared between the radio base station apparatus and communication terminal apparatus in aforementioned Embodiments 1 to 4. Furthermore, this embodiment will also describe a setting of spreading code information (channelization code information, scrambling code information) which needs to be shared between the radio base station apparatus and communication terminal apparatus in addition to the timing information and signature information. In the following explanations, the timing information, signature information and spreading code information will be collectively referred to as "physical channel parameters."

Figure 27:
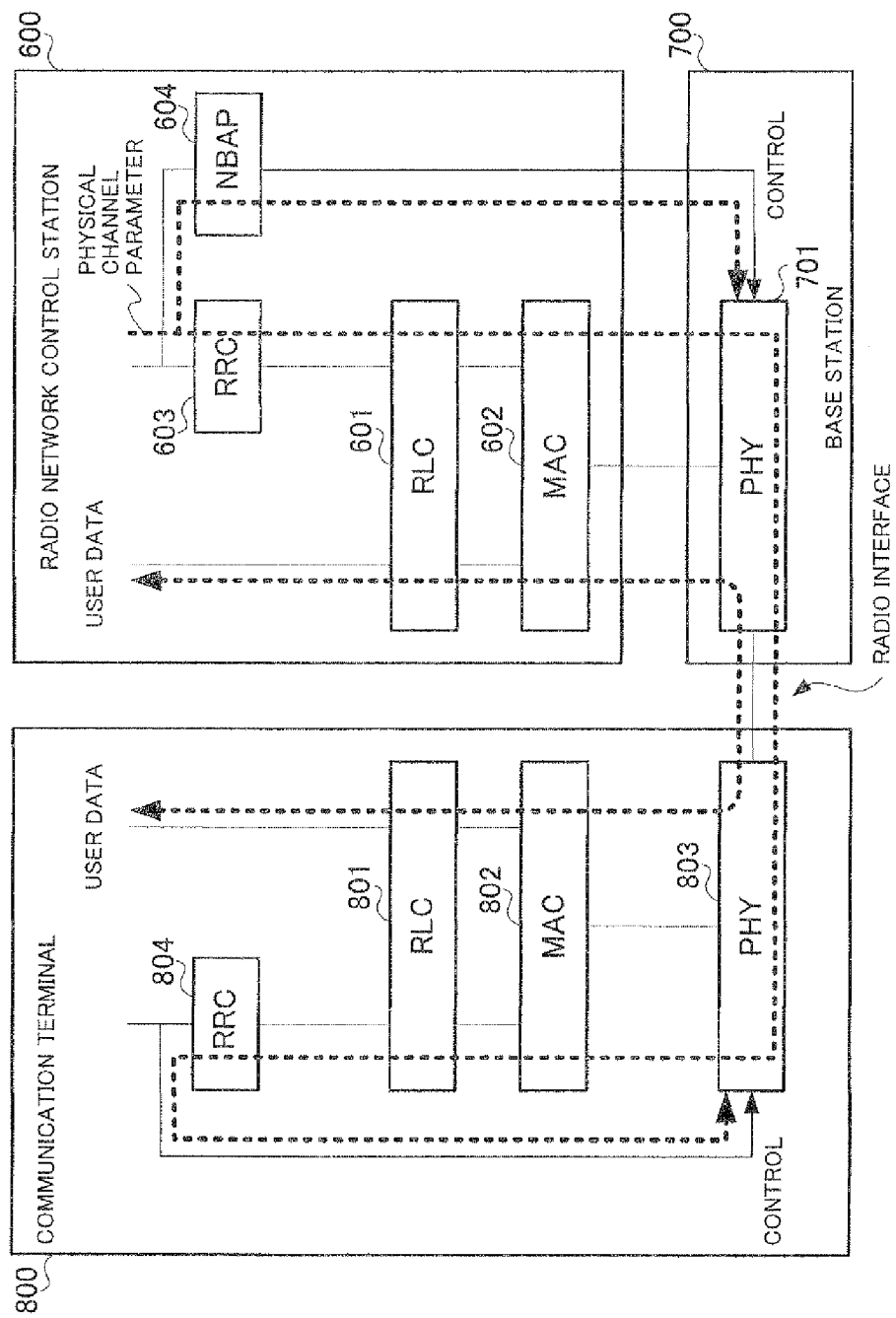
FIG. 27 illustrates the configuration of a system for setting physical channel parameters according to Embodiment 5 through signaling.

This embodiment sets the physical channel parameters through signaling from a higher level apparatus such as a radio network control station. FIG. 27 shows a system configuration to realize this setting.

The physical channel parameters are generated by a radio network control station (RNC) 600 which is a higher level apparatus of a base station 700. These physical channel parameters are converted to control signals for controlling parameters of the base station 700 by an NBAP (Node B Application Part) 604 and then sent to a physical layer (PHY)

701 of the base station 700. In this way, the physical channel parameters are set in the physical layer (PHY) 701 of the base station 700.

Furthermore, the physical channel parameters generated in the radio network control station 600 are passed through an RRC (Radio Resource Control) 603, RLC (Radio Link Control) 601 and MAC (Medium Access Control) 602 of the radio network control station 600 one by one, converted to data applicable to the physical layer 701 of the base station 700 and then transmitted from the physical layer 701 of the base station 700 to a physical layer 803 of the communication terminal 800 by radio.

These physical channel parameters are passed through a MAC 802, RLC 801 and RRC 804 of the communication terminal 800 one by one, converted to control signals for controlling parameters of the physical layer 803 and then sent to the physical layer 803. In this way, the physical channel parameters are set in the physical layer 803 of the communication terminal 800.

Figure 26:
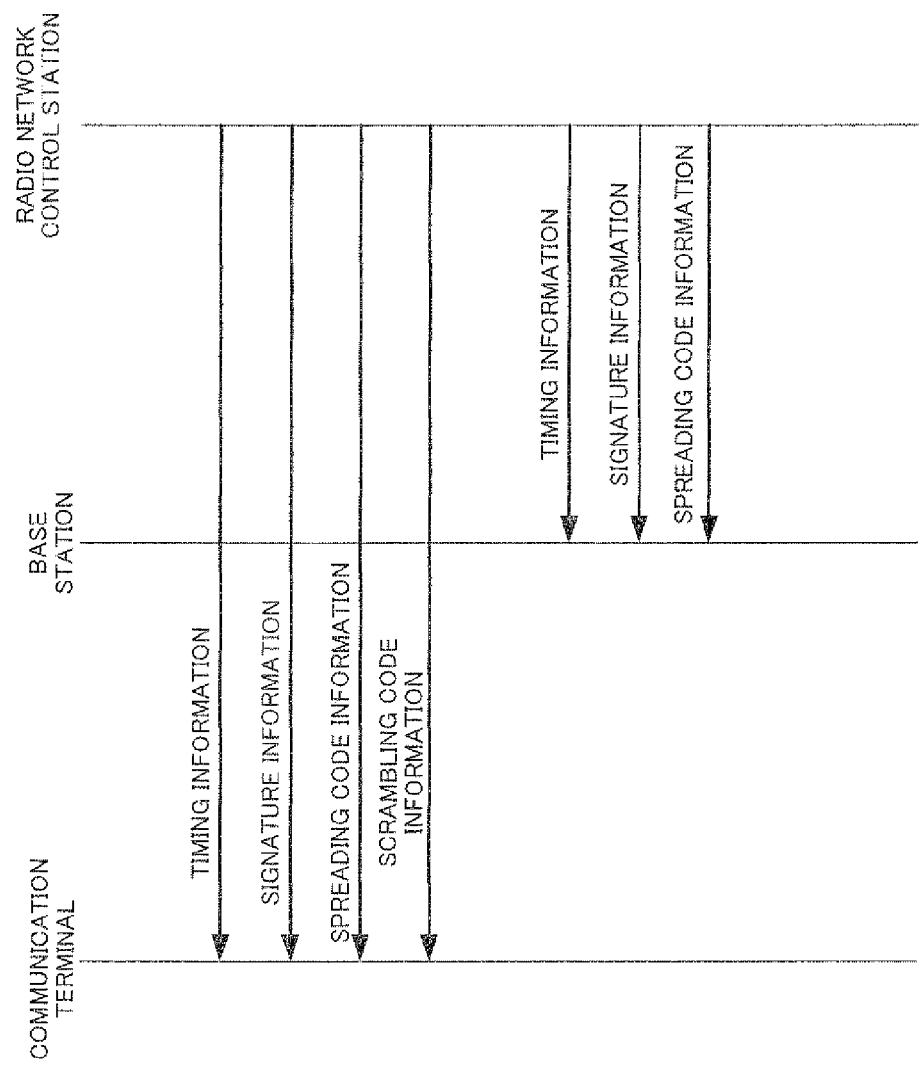
FIG. 26 illustrates signaling of physical channel parameters from a higher level apparatus to a communication terminal and base station.

In this way, as shown in FIG. 26, the same physical channel parameters are transmitted from the radio network control station 600 to both the base station 700 and communication terminal 800 and these physical channel parameters are set in the physical layers 701, 803 of the respective apparatuses.

Thus, as in the case of Embodiments 1 to 4, this embodiment presets a multiplexing rule between a radio base station and each communication terminal, and in constructing a radio communication system in which the radio base station multiplexes the control information directed to a plurality of communication terminals according to the multiplexing rule, spreads the multiplexed control information using a spreading code common to the respective communication terminals, transmits the spread control information by radio, and the communication terminal despreads the received signal using the common spreading code and extracts the control information directed to the own station according to the multiplexing rule from the despread signal, this embodiment causes the multiplexing rule (physical channel parameters) which needs to be shared between the radio base station apparatus and communication terminal apparatus to be transmitted to the base station 700 and communication terminal 800 through signaling from the higher level apparatus such as the radio network control station 600, and can thereby set the multiplexing rule easily.

As in the case of Embodiment 1 where the configuration of the PICH physical channel is used as is, a channelization code is set as timing information (number of paging indicator) and spreading code information This is because when the standardization specification stipulates that a scrambling code is the same as a P-CPICH, the scrambling code need not be set additionally.

Furthermore, as in the case of Embodiment 3 where the configuration of the AICH physical channel is used as is, a channelization code is set as signature information (signature number), timing information (access slot number) and spreading code information. If the standardization specification stipulates that a scrambling code is the same as a P-CPICH, the scrambling code need not be set additionally in this case, either.

Other Embodiments

The above described embodiments have described RG information for controlling the transmission rate of uplink packet transmission and ACK/NACK for controlling retransmission as an example of control information for each communication terminal to perform uplink packet transmission using a dedicated channel and described the case where this RG information and ACK/NACK are sent from the radio base station apparatus to the communication terminal apparatus, but the above described control information is not limited to this.

The control information may also be, for example, transmit power of an uplink dedicated channel packet, coding rate of an uplink dedicated channel packet, modulation scheme of uplink dedicated channel packets, number of spreading codes of uplink dedicated channel packets, data size of uplink dedicated channel packets and effects similar to those in the above described embodiments can also be obtained when such control information is transmitted.

Embodiment 2 and Embodiment 3 described above have explained the method for forming a control information channel according to each type of control information and total number of bits and the method for grouping communication terminals in the cell and forming a control information channel for each piece of control information of each group as the method for increasing the number of transmittable control information pieces or the number of communication terminals when a PICH data structure is diverted and when an AICH data structure is diverted, but these methods are not limited to cases where the PICH data structure is diverted or AICH data structure is diverted, and can also be widely used when control information for transmitting uplink packets of a plurality of communication terminals is multiplexed and transmitted.

In the above described embodiments, control information is not subjected to error correcting coding, but the present invention can also be adapted so as to carry out error correcting coding and then multiplex the control information on the aforementioned control information channel and transmit the multiplexed control information.

Furthermore, when the PICH data structure is diverted and when the AICH data structure is diverted, a no transmission section necessarily exists in terms of the data structure, and control information can also be transmitted using this no transmission section.

The present invention is not limited to the above described embodiments, but can be implemented modified in various ways.

A mode of the radio base station apparatus of the present invention comprises a first transmission signal formation section that forms dedicated channel signals directed to a plurality of communication terminals by spreading transmission data directed to each communication terminal using a spreading code assigned to each communication terminal and a second transmission signal formation section that forms transmission signals directed to a plurality of communication terminals by multiplexing control information directed to each communication terminal for each communication terminal to carry out uplink packet transmission using a dedicated channel based on a multiplexing rule preset between the base station apparatus and each communication terminal and spreading the control information using a spreading code common to the respective communication terminals.

According to this configuration, instead of embedding control information for uplink packet transmission in a dedicated channel, the second transmission signal formation section is provided apart from the first transmission signal formation section that forms the dedicated channel signal so as to multiplex and transmit the control information through this second transmission signal formation section, and therefore it is possible transmit control information for uplink packet transmission without changing the processing of the existing first transmission signal formation section (that is, without changing the existing dedicated channel). Furthermore, the second transmission signal formation section multiplexes control information directed to each communication terminal based on a multiplexing rule predetermined between the base station apparatus and each communication terminal, and therefore once a multiplexing rule is set, the communication terminal can extract control information directed to the own station from among the control information multiplexed according to the multiplexing rule. As a result, it is not necessary to add identification information indicating to which communication terminal the control information is directed every time the control information is transmitted, and it is possible to thereby reduce an amount of information transmitted on a downlink by the amount corresponding to the saved control information. Furthermore, the second transmission signal formation section spreads the multiplexed control information using a spreading code common to the communication terminals, and can thereby save spreading code resources.

According to another mode of the radio base station apparatus of the present invention, the second transmission signal formation section time-division multiplexes the control information directed to each communication terminal at a position predetermined between the base station apparatus and each communication terminal.

According to this configuration, if timing information on time-division multiplexing is set as a multiplexing rule between the radio base station apparatus and each communication terminal, the radio base station apparatus can easily multiplex control information directed to each communication terminal according to the timing information and the communication terminal can extract control information directed to the own station according to the timing information.

According to a further mode of the radio base station apparatus of the present invention, the second transmission signal formation section diverts a PICH (Page Indication Channel) data structure, assigns the control information to the bit of the paging indicator disposed through a PICH on a time-division basis and thereby time-division multiplexes the control signal directed to each communication terminal.

According to this configuration, the existing PICH data structure is diverted and control information is time-division multiplexed and transmitted, and therefore it is possible to divert a PICH transmission circuit at the base station and a PICH reception circuit at the communication terminal and suppress an increase in the circuit scales of the base station and communication terminal.

According to a still further mode of the radio base station apparatus of the present invention, the second transmission signal formation section assigns symbol patterns which vary from one communication terminal to another from among a plurality of symbol patterns, changes the polarities of the assigned symbol patterns according to the contents of the corresponding control signals to thereby multiplex the control information directed to each communication terminal.

According to this configuration, if a symbol pattern specific to the own station is set in a communication terminal, the communication terminal can extract only the symbol pattern of the own station from symbol patterns directed to a plurality of multiplexed communication terminals and know the contents of the control information directed to the own station by deciding the polarity of the extracted symbol pattern. Furthermore, it is possible to extend the time for transmitting 1-bit control information compared to a case with time-division multiplexing and thereby increase resistance to variations in a propagation path such as fading.

According to a still further mode of the radio base station apparatus of the present invention, the second transmission signal formation section diverts an AICH (Acquisition Indication Channel) data structure and multiplexes the control information directed to each communication terminal using this AICH signature.

According to this configuration, an existing AICH data structure is diverted and control information is multiplexed using signature and transmitted, and therefore it is possible to divert an AICH transmission circuit at the base station and AICH reception circuit at the communication terminal and suppress an increase in the circuit scales of the base station and communication terminal.

A still further mode of the radio base station apparatus of the present invention further comprises a first transmit power control section that controls transmit power of a dedicated channel signal formed by the first transmission signal formation section for each dedicated channel and a second transmit power control section that controls transmit power of control information directed to each communication terminal multiplexed by the second transmission signal formation section in accordance with the transmit power of the corresponding dedicated channel.

According to this configuration, not all control signals directed to a plurality of multiplexed communication terminals are equalized, but differentiated by the second transmit power control section according to the condition of the propagation path to/from each communication terminal, which not only improves reliability of the control signal directed to each communication terminal but also improves the utilization efficiency of transmit power resources. Furthermore, interference with other cells can also be suppressed.

According to a still further mode of the radio base station apparatus of the present invention, the second transmission signal formation section comprises a first spreading section that spreads first control information directed to each communication terminal using a first spreading code common to the communication terminals and a second spreading section that spreads second control information directed to each communication terminal using a second spreading code common to the communication terminals.

According to this configuration, when control information directed to a plurality of communication terminals is transmitted by diverting a PICH or AICH data structure, a spreading code (channelization code or scrambling code) is changed according to the type of control information considering that there are limits to the number of transmittable control information pieces and the number of communication terminals. For example, a first spreading code common to the communication terminals is used for information (RG information) specifying the transmission rate and a second spreading code common to the communication terminals is used for ACK/NACK. As a result, it is possible to increase the number of transmittable control information pieces and the number of communication terminals even when a PICH or AICH data structure is diverted.

According to a still further mode of the radio base station apparatus of the present invention, the second transmission signal formation section divides a plurality of communication terminals carrying out uplink packet transmission into at least two groups and comprises a first spreading section that spreads the control information directed to the communication terminals of the first group using a first spreading code common to the first group communication terminals and a second spreading section that spreads the control information directed to the communication terminals of the second group using a second spreading code common to the second group communication terminals.

According to this configuration, when control information directed to a plurality of communication terminals by diverting a PICH or AICH data structure, the communication terminals are grouped in consideration of the number of transmittable control information pieces and the number of communication terminals and spreading codes (channelization codes or scrambling codes) are changed group by group. For example, when there are 20 communication terminals to which the control information is to be transmitted in the cell, a first spreading code common to 10 communication terminals is used for these communication terminals and a second spreading code common to other 10 communication terminals is used for these communication terminals. As a result, even when a PICH or AICH data structure is diverted, it is possible to increase the number of transmittable control information pieces and the number of communication terminals as appropriate.

A mode of the communication terminal apparatus of the present invention comprises a despreading section that despreads a signal received from a radio base station apparatus using a spreading code common in a cell, a channel decoding section that extracts control information directed to the own station from the control information directed to a plurality of communication terminals multiplexed in the despread signal based on a multiplexing rule preset between the communication terminal apparatus and the radio base station apparatus, and a transmission signal formation section that controls the transmission rate of transmission packet data, coding rate, spreading factor, number of spreading codes, modulation scheme, packet data size, transmit power or retransmission to form an uplink transmission packet based on the extracted control information.

A mode of the method of transmitting control information according to the present invention is a method for a radio base station to transmit control information to a plurality of communication terminals in a cell so that each communication terminal forms an uplink transmission packet signal using a dedicated channel, comprising the steps of presetting a multiplexing rule between the radio base station and each communication terminal, the radio base station multiplexing the control information directed to a plurality of communication terminals according to the multiplexing rule, spreading the multiplexed control information using a spreading code common to the communication terminals and transmitting the control information by radio, and the communication terminal despreading a received signal using the common spreading code and extracting the control information directed to the own station from the despread signal according to the multiplexing rule.

A mode of the radio communication system of the present invention comprises a radio base station apparatus that multiplexes control information directed to a plurality of communication terminals according to a multiplexing rule preset between the base station apparatus and the plurality of communication terminals, spreads the multiplexed control information using a spreading code common to the communication terminals and transmits the spread control information by radio and communication terminal apparatuses that despread the received signal using the common spreading code, extract the control information directed to the own station from the despread signal according to the multiplexing rule and form an uplink packet signal to be transmitted based on the extracted control information using a dedicated channel.

Another mode of the radio communication system of the present invention sets a multiplexing rule for the radio base station apparatus and communication terminal apparatuses according to signaling from a higher level apparatus.

As described above, the present invention can transmit control information to all communication terminals carrying out uplink packet transmission in order for the communication terminals to form an uplink transmission packet signal without transmitting identification information for identifying the communication terminals and without changing dedicated channels.

This application is based on the Japanese Patent Application No. 2003-135117 filed on May 13, 2003, entire content of which is expressly incorporated by reference herein.

INDUSTRIAL APPLICABILITY

The present invention is preferably applicable to a radio communication system made up of radio communication terminals such as cellular phone sets and a base station.

| [FIG. 1] | |
|---|---|
| 10 | RADIO BASE STATION APPARATUS |
| | TRANSMISSION DATA |
| 12 | CHANNEL ENCODING SECTION |
| 13 | MODULATION SECTION |
| 14 | SPREADING SECTION |
| 16 | TRANSMIT POWER CONTROL SECTION |
| 17 | TRANSMISSION RADIO SECTION |
| | RG INFORMATION |
| | RR INFORMATION |
| 32 | SCHEDULING SECTION |
| | RECEPTION POWER MARGIN |
| 31 | RECEPTION POWER MEASURING SECTION |
| | MAXIMUM RECEPTION POWER |
| 30 | TPC GENERATION SECTION |
| 29 | SIR MEASURING SECTION |
| 24 | CHANNEL DECODING SECTION |
| | RECEIVED DATA |
| 23 | DEMODULATION SECTION |
| 22 | DESPREADING SECTION |
| 20 | RECEPTION RADIO SECTION |
| 28 | ERROR DETECTION SECTION |
| 27 | CHANNEL DECODING SECITON |
| 26 | DEMODULATION SECTION |
| 25 | DESPREADING SECTION |
| | RECEIVED PACKET DATA |
| | RR INFORMATION |
| | [FIG. 2] |
| 65 | TRANSMIT POWER MEASURING SECTION |
| | TRANSMIT POWER MARGIN |
| | MAXIMUM TRANSMIT POWER |
| 57 | TRANSMISSION RATE SELECTION SECTION |
| 56 | RATE REQUEST SELECTION SECTION |
| | RG INFORMATION |
| 63 | TRANSMIT POWER CONTROL SECTION |
| | OFFSET AMOUNT |
| 58 | TRANSMISSION PARAMETER SETTING SECTION |
| 55 | DATA AMOUNT MEASURING SECTION |
| 61 | SPREADING SECTION |
| 60 | MODULATION SECTION |
| 59 | CHANNEL ENCODING SECTION |

Figure 3:
FIG. 3 illustrates frame block diagrams of various conventional dedicated channels.

| | RR INFORMATION | |
|---|---|---|
| 54 | BUFFER | |
| | TRANSMISSION PACKET DATA | |
| 66 | TRANSMISSION RADIO SECTION | |
| 52 | SPREADING SECTION | |
| 51 | MODULATION SECTION | |
| 50 | CHANNEL ENCODING SECTION | |
| | TRANSMISSION DATA | |
| 64 | TRANSMIT POWER CONTROL SECTION | |
| 42 | RECEPTION RADIO SECTION | |
| 43 | DESPREADING SECTION | |
| 46 | SIR MEASURING SECTION | |
| 44 | DEMODULATION SECTION | |
| 47 | TPC GENERATION SECTION | |
| 45 | CHANNEL DECODING SECTION | |
| | RECEIVED DATA | |
| | RG INFORMATION | |
| 40 | COMMUNICATION TERMINAL APPARATUS | |
| | [FIG. 3] | |
| | COMMUNICATION TERMINAL N DOWNLINK CONTROL INFORMATION | |
| | (RG INFORMATION, ACK/NACK, etc.) | |
| | COMMUNICATION TERMINAL N DEDICATED CHANNEL DATA | |
| | COMMUNICATION TERMINAL N DEDICATED CHANNEL | |
| | COMMUNICATION TERMINAL 2 DEDICATED CHANNEL | |
| | COMMUNICATION TERMINAL 1 DEDICATED CHANNEL | |
| | TIME | |
| 1 | FRAME | |
| | [FIG. 4] | |
| 100 | RADIO BASE STATION APPARATUS | |
| | TRANSMISSION DATA | |
| 102 | CHANNEL ENCODING SECTION | |
| 103 | MODULATION SECTION | |
| 104 | SPREADING SECTION | |
| 106 | TRANSMIT POWER CONTROL SECTION | |
| 107 | TRANSMISSION RADIO SECTION | |
| | TIMING INFORMATION | |
| 111 | CHANNEL ENCODING SECTION | |
| 115 | TRANSMIT POWER SETTING SECTION | |
| 113 | SPREADING SECTION | |
| 112 | MODULATION SECTION | |
| | RG INFORMATION | |
| | RR INFORMATION | |
| 32 | SCHEDULING SECITON | |
| | RECEPTION POWER MARGIN | |
| 31 | RECEPTION POWER MEASURING SECTION | |
| | MAXIMUM RECEPTION POWER | |
| 30 | TPC GENERATION SECTION | |
| 29 | SIR MEASURING SECTION | |
| 24 | CHANNEL DECODING SECTION | |
| | RECEIVED DATA | |
| 23 | DEMODULATION SECTION | |
| 22 | DESPREADING SECTION | |
| 20 | RECEPTION RADIO SECTION | |
| 28 | ERROR DETECTION SECTION | |
| 27 | CHANNEL DECODING SECITON | |
| 26 | DEMODULATION SECTION | |
| 25 | DESPREADING SECTION | |
| | RECEIVED PACKET DATA | |
| | RR INFORMATION | |
| | [FIG. 5] | |
| 65 | TRANSMIT POWER MEASURING SECTION | |
| | TRANSMIT POWER MARGIN | |
| | MAXIMUM TRANSMIT POWER | |
| 57 | TRANSMISSION RATE SELECTION SECTION | |
| 56 | RATE REQUEST SELECTION SECTION | |

| | RG INFORMATION | |
|---|---|---|
| 63 | TRANSMIT POWER CONTROL SECTION | |
| | OFFSET AMOUNT | |
| 58 | TRANSMISSION PARAMETER SETTING SECTION | |
| 55 | DATA AMOUNT MEASURING SECTION | |
| 61 | SPREADING SECTION | |
| 60 | MODULATION SECTION | |
| 59 | CHANNEL ENCODING SECTION | |
| | RR INFORMATION | |
| 54 | BUFFER | |
| | TRANSMISSION PACKET DATA | |
| 66 | TRANSMISSION RADIO SECTION | |
| 52 | SPREADING SECTION | |
| 51 | MODULATION SECTION | |
| 50 | CHANNEL ENCODING SECTION | |
| | TRANSMISSION DATA | |
| 64 | TRANSMIT POWER CONTROL SECTION | |
| 42 | RECEPTION RADIO SECTION | |
| 43 | DESPREADING SECTION | |
| 46 | SIR MEASURING SECTION | |
| 44 | DEMODULATION SECTION | |
| 47 | TPC GENERATION SECTION | |
| 45 | CHANNEL DECODING SECDTION | |
| | RECEIVED DATA | |
| 201 | DESPREADING SECTION | |
| 202 | DEMODULATION SECTION | |
| 203 | CHANNEL DECODING SECDTION | |
| | RG INFORMATION | |
| | TIMING INFORMATION | |
| 200 | COMMUNICATION TERMINAL APPARATUS | |
| | [FIG. 6] | |
| | COMMUNICATION TERMINAL 1 DOWNLINK CONTROL INFORMATION | |
| | (RG INFORMATION, ACK/NACK, etc.) | |
| | COMMUNICATION TERMINAL 2 DOWNLINK CONTROL INFORMATION | |
| | (RG INFORMATION, ACK/NACK, etc.) | |
| | COMMUNICATION TERMINAL N DOWNLINK CONTROL INFORMATION | |
| | (RG INFORMATION, ACK/NACK, etc.) | |
| | DOWNLINK CONTROL INFORMATION CHANNEL | |
| | COMMUNICATION TERMINAL N DEDICATED CHANNEL | |
| | COMMUNICATION TERMINAL N DEDICATED CHANNEL DATA | |
| | COMMUNICATION TERMINAL 2 DEDICATED CHANNEL | |
| | COMMUNICATION TERMINAL 1 DEDICATED CHANNEL | |
| | TIME | |
| 1 | FRAME | |
| | [FIG. 7] | |
| | ACCESS SLOT | |
| | SUBFRAME | |
| | SUBFRAME #0 SUBFRAME #1 SUBFRAME #2 SUBFRAME #3 | |
| | SUBFRAME #4 | |
| | [FIG. 8] | |
| | 288 bits (PAGING INDICATOR) | |
| | 12 bits (NO TRANSMISSION) | |
| 1 | FRAME (10 ms) | |
| | [FIG. 9] | |
| | NUMBER OF PAGING INDICATORS (Np) | |
| | [FIG. 10] | |
| 120 | CHANNEL ENCODING SECTION | |
| | RG INFORMATION | |
| 121 | SELECTION SECTION | |
| 122 | REPETITION SECTION | |
| 123 | MAPPING SECTION | |

-continued

| | |
|---|---|
| | TIMING INFORMATION |
| | REPETITION COUNT |
| 112 | MODULATION SECTION |
| 113 | SPREADING SECTION |
| | TO TRANSMISSION RADIO SECTION |
| 115 | TRANSMIT POWER SETTING SECTION |

[FIG. 11]

| | |
|---|---|
| | FROM RECEPTION RADIO SECTION |
| 201 | DESPREADING SECTION |
| 202 | DEMODULATION SECTION |
| 210 | CHANNEL DECODING SECTION |
| 211 | DE-REPETITION SECTION |
| 212 | POLARITY DECISION SECTION |
| | RG INFORMATION |
| | TIMING INFORMATION |
| | REPETITION COUNT |

[FIG. 12]

| | |
|---|---|
| 131A | SELECTION SECTION |
| | TIMING INFORMATION |
| 132A | REPETITION SECTION |
| | REPETITION COUNT |
| 133A | MAPPING SECTION |
| 130 | CHANNEL ENCODING SECTION |
| | RG INFORMATION |
| 131B | SELECTION SECTION |
| 132B | REPETITION SECTION |
| 133B | MAPPING SECTION |
| 115A | TRANSMIT POWER SETTING SECTION |
| 112A | MODULATION SECTION |
| 113A | SPREADING SECTION |
| | TO TRANSMISSION RADIO SECTION |
| 112B | MODULATION SECTION |
| 113B | SPREADING SECTION |
| | TO TRANSMISSION RADIO SECTION |
| 115B | TRANSMIT POWER SETTING SECTION |

[FIG. 13]

| | |
|---|---|
| | FROM RECEPTION RADIO SECTION |
| 201A | DESPREADING SECTION |
| 202A | DEMODULATION SECTION |
| 220A | CHANNEL DECODING SECTION |
| 221A | DE-REPETITION SECTION |
| 222A | POLARITY DECISION SECTION |
| | TIMING INFORMATION |
| | REPETITION COUNT |
| 201B | DESPREADING SECTION |
| 202B | DEMODULATION SECTION |
| 220B | CHANNEL DECODING SECTION |
| 221B | DE-REPETITION SECTION |
| 222B | POLARITY DECISION SECTION |
| | RG INFORMATION |

[FIG. 14]

| | |
|---|---|
| 141 | SELECTION SECTION |
| 142A | REPETITION SECTION |
| 143A | MAPPING SECTION |
| 140 | CHANNEL ENCODING SECTION |
| | REPETITION COUNT |
| | RG INFORMATION |
| 142B | REPETITION SECTION |
| 143B | MAPPING SECTION |
| 115A | TRANSMIT POWER SETTING SECTION |
| | TIMING INFORMATION |
| | CODE ASSIGNMENT INFORMATION |
| 112A | MODULATION SECTION |
| 113A | SPREADING SECTION |

-continued

| | |
|---|---|
| | TO TRANSMISSION RADIO SECTION |
| 112B | MODULATION SECTION |
| 113B | SPREADING SECTION |
| | TO TRANSMISSION RADIO SECTION |
| | TRANSMIT POWER SETTING SECTION |

[FIG. 15]

| | |
|---|---|
| 300 | RADIO BASE STATION APPARATUS |
| | TRANSMISSION DATA |
| 102 | CHANNEL ENCODING SECTION |
| 103 | MODULATION SECTION |
| 104 | SPREADING SECTION |
| 106 | TRANSMIT POWER CONTROL SECTION |
| 107 | TRANSMISSION RADIO SECTION |
| | SIGNATURE INFORMATION |
| | TIMING INFORMATION |
| 302 | CHANNEL ENCODING SECTION |
| 115 | TRANSMIT POWER SETTING SECTION |
| 113 | SPREADING SECTION |
| 112 | MODULATION SECTION |
| | RG INFORMATION |
| | RR INFORMATION |
| 32 | SCHEDULING SECTION |
| | RECEPTION POWER MARGIN |
| 31 | RECEPTION POWER MEASURING SECTION |
| | MAXIMUM RECEPTION POWER |
| 30 | TPC GENERATION SECTION |
| 29 | SIR MEASURING SECTION |
| 24 | CHANNEL DECODING SECTION |
| | RECEIVED DATA |
| 23 | DEMODULATION SECTION |
| 22 | DESPREADING SECTION |
| 20 | RECEPTION RADIO SECTION |
| 28 | ERROR DETECTION SECTION |
| 27 | CHANNEL DECODING SECTION |
| 26 | DEMODULATION SECTION |
| 25 | DESPREADING SECTION |
| | RECEIVED PACKET DATA |
| | RR INFORMATION |

[FIG. 16]

| | |
|---|---|
| 302 | CHANNEL ENCODING SECTION |
| | TIMING INFORMATION |
| | SIGNATURE INFORMATION |
| 304 | PATTERN TABLE |
| 305-1 | POLARITY INVERSION SECTION |
| 305-2 | POLARITY INVERSION SECTION |
| 305-M | POLARITY INVERSION SECTION |
| 303 | SELECTION SECTION |
| | RG INFORMATION |

[FIG. 17]

| | |
|---|---|
| 65 | TRANSMIT POWER MEASURING SECTION |
| | TRANSMIT POWER MARGIN |
| | MAXIMUM TRANSMIT POWER |
| 57 | TRANSMISSION RATE SELECTION SECTION |
| 56 | RATE REQUEST SELECTION SECTION |
| | RG INFORMATION |
| 63 | TRANSMIT POWER CONTROL SECTION |
| | OFFSET AMOUNT |
| 58 | TRANSMISSION PARAMETER SETTING SECTION |
| 55 | DATA AMOUNT MEASURING SECTION |
| 61 | SPREADING SECTION |
| 60 | MODULATION SECTION |
| 59 | CHANNEL ENCODING SECTION |

| | -continued |
|---|---|
| | RR INFORMATION |
| 54 | BUFFER |
| | TRANSMISSION PACKET DATA |
| 66 | TRANSMISSION RADIO SECTION |
| 52 | SPREADING SECTION |
| 51 | MODULATION SECTION |
| 50 | CHANNEL ENCODING SECTION |
| | TRANSMISSION DATA |
| 64 | TRANSMIT POWER CONTROL SECTION |
| 42 | RECEPTION RADIO SECTION |
| 43 | DESPREADING SECTION |
| 46 | SIR MEASURING SECTION |
| 44 | DEMODULATION SECTION |
| 47 | TPC GENERATION SECTION |
| 45 | CHANNEL DECODING SECTION |
| | RECEIVED DATA |
| 201 | DESPREADING SECTION |
| 202 | DEMODULATION SECTION |
| 401 | CHANNEL DECODING SECTION |
| | RG INFORMATION |
| | TIMING INFORMATION |
| | SIGNATURE INFORMATION |
| 400 | COMMUNICATION TERMINAL APPARATUS |
| | [FIG. 18] |
| 401 | CHANNEL DECODING SECTION |
| 402 | PATTERN IDENTIFICATION SECTION |
| 403 | POLARITY DECISION SECTION |
| | RG INFORMATION |
| | SIGNATURE INFORMATION |
| | TIMING INFORMATION |
| | [FIG. 19] |
| | COMMUNICATION TERMINAL N DOWNLINK CONTROL INFORMATION |
| | (RG INFORMATION, ACK/NACK, etc.) |
| | DOWNLINK CONTROL INFORMATION CHANNEL |
| | COMMUNICATION TERMINAL 2 DOWNLINK CONTROL INFORMATION |
| | (RG INFORMATION, ACK/NACK, etc.) |
| | COMMUNICATION TERMINAL 1 DOWNLINK CONTROL INFORMATION |
| | (RG INFORMATION, ACK/NACK, etc.) |
| | COMMUNICATION TERMINAL N DEDICATED CHANNEL |
| | COMMUNICATION TERMINAL N DEDICATED CHANNEL DATA |
| | COMMUNICATION TERMINAL N DEDICATED CHANNEL |
| | COMMUNICATION TERMINAL 2 DEDICATED CHANNEL |
| | COMMUNICATION TERMINAL 1 DEDICATED CHANNEL |
| | TIME |
| 1 | FRAME |
| | [FIG. 20] |
| (a) | ACCESS SLOT |
| | TRANSMISSION CHECK (AI) |
| (b) | PREAMBLE |
| | PREAMBLE |
| | MESSAGE SECTION |
| | [FIG. 21] |
| | ACQUISITION INDICATOR SECTION |
| | 4098 CHIPS, 32 SYMBOLS 1024 CHIPS |
| | NO TRANSMISSION |
| | [FIG. 23] |
| 500 | RADIO BASE STATION APPARATUS |
| | TRANSMISSION DATA |
| 102 | CHANNEL ENCODING SECTION |
| 103 | MODULATION SECTION |
| 104 | SPREADING SECTION |
| 106 | TRANSMIT POWER CONTROL SECTION |
| 107 | TRANSMISSION RADIO SECTION |

| | -continued |
|---|---|
| | TRANSMIT POWER OFFSET |
| 502 | AVERAGE POWER CALCULATION SECTION |
| | TIMING INFORMATION |
| 503 | TRANSMIT POWER SETTING SECTION |
| 113 | SPREADING SECTION |
| 111 | CHANNEL ENCODING SECTION |
| 112 | MODULATION SECTION |
| | RG INFORMATION |
| | RR INFORMATION |
| 32 | SCHEDULING SECTION |
| | RECEPTION POWER MARGIN |
| 31 | RECEPTION POWER MEASURING SECTION |
| | MAXIMUM RECEPTION POWER |
| 30 | TPC GENERATION SECTION |
| 29 | SIR MEASURING SECTION |
| 24 | CHANNEL DECODING SECTION |
| | RECEIVED DATA |
| 23 | DEMODULATION SECTION |
| 22 | DESPREADING SECTION |
| 20 | RECEPTION RADIO SECTION |
| 28 | ERROR DETECTION SECTION |
| 27 | CHANNEL DECODING SECITON |
| 26 | DEMODULATION SECTION |
| 25 | DESPREADING SECTION |
| | RECEIVED PACKET DATA |
| | RR INFORMATION |
| | [FIG. 24] |
| | COMMUNICATION TERMINAL 1 DOWNLINK CONTROL INFORMATION |
| | (RG INFORMATION, ACK/NACK, etc.) |
| | COMMUNICATION TERMINAL 2 DOWNLINK CONTROL INFORMATION |
| | (RG INFORMATION, ACK/NACK, etc.) |
| | COMMUNICATION TERMINAL N DOWNLINK CONTROL INFORMATION |
| | (RG INFORMATION, ACK/NACK, etc.) |
| | TRANSMIT POWER |
| | DOWNLINK CONTROL INFORMATION CHANNEL |
| | TIME |
| 1 | FRAME |
| | [FIG. 25] |
| | COMMUNICATION TERMINAL 1 DOWNLINK CONTROL INFORMATION |
| | (RG INFORMATION, ACK/NACK, etc.) |
| | COMMUNICATION TERMINAL 2 DOWNLINK CONTROL INFORMATION |
| | (RG INFORMATION, ACK/NACK, etc.) |
| | COMMUNICATION TERMINAL N DOWNLINK CONTROL INFORMATION |
| | (RG INFORMATION, ACK/NACK, etc.) |
| | TRANSMIT POWER |
| | DOWNLINK CONTROL INFORMATION CHANNEL |
| | TIME |
| 1 | FRAME |
| | [FIG. 26] |
| | COMMUNICATION TERMINAL |
| | BASE STATION |
| | RADIO NETWORK CONTROL STATION |
| | TIMING INFORMATION |
| | SIGNATURE INFORMATION |
| | SPREADING CODE INFORMATION |
| | SCRAMBLING CODE INFORMATION |
| | TIMING INFORMATION |
| | SIGNATURE INFORMATION |
| | SPREADING CODE INFORMATION |

-continued

[FIG. 27]

| | | |
|---|---|---|
| 800 | COMMUNICATION TERMINAL | |
| | USER DTA | |
| | CONTROL | |
| 600 | RADIO NETWORK CONTROL STATION | |
| | USER DATA | |
| | PHYSICAL CHANNEL PARAMETER | |
| | CONTROL | |
| 700 | BASE STATION | |
| | RADIO INTERFACE | |

What is claimed is:

1. A radio base station apparatus that communicates with a communication terminal, the radio base station apparatus comprising:
a table storing a plurality of symbol patterns that are mutually uncorrelated and differ between types of control information;
an encoder that encodes a plurality of types of control information for a single communication terminal for use in uplink packet transmission, using the symbol patterns; and
a spreader that spreads the plurality of types of control information after the encoding, using a single spreading code common between the plurality of types of control information,
wherein one of the symbol patterns or the plurality of symbol patterns are assigned to the communication terminal and polarities of the assigned one symbol pattern or the assigned plurality of symbol patterns are changed according to the type of control information to be transmitted.

2. The radio base station apparatus of claim 1, wherein the plurality of types of control information comprises at least one of a packet transmission rate, a coding rate, a spreading factor, the number of spreading codes, a modulation scheme, a packet data size, a transmit power, and information about retransmission.

3. A radio base station apparatus that communicates with a communication terminal, the radio base station apparatus comprising:
a first transmission signal former that spreads transmission data for a first communication terminal using a first spreading code assigned to said first communication terminal and forms a first dedicated channel signal for said first communication terminal, and that spreads transmission data for a second communication terminal using a second spreading code assigned to said second communication terminal and forms a second dedicated channel signal for said second communication terminal; and
a second transmission signal former that multiplexes a plurality of types of first control information for the first communication terminal and a plurality of types of second control information for the second communication terminal using a third spreading code, which is provided for common use by the first and second communication terminals, and a plurality of mutually uncorrelated symbol patterns that differ between the plurality of types of first control information and between the plurality of types of second control information and that forms transmission signals for the first and second communication terminals, wherein the second transmission signal former comprises a table storing the plurality of symbol patterns that are mutually uncorrelated and differ between the types of control information, and an encoder that encodes the plurality of types of first control information and the plurality of types of second control information, using the symbol patterns,
wherein one of the symbol patterns or the plurality of symbol patterns are assigned to the communication terminal and polarities of the assigned one symbol pattern or the assigned plurality of symbol patterns are changed according to the type of control information to be transmitted.

4. The radio base station apparatus of claim 3, further comprising:
a first transmit power controller that controls transmit power of dedicated channel signals on a per dedicated channel basis; and
a second transmit power controller that controls a transmit power of the plurality of types of first control information and a transmit power of the plurality of types of second control information, according to a transmit power of a dedicated channel for the first communication terminal and a transmit power of a dedicated channel for the second communication terminal, respectively.

5. A radio base station apparatus that communicates with a communication terminal, the radio base station apparatus comprising a multiplexer that multiplexes a plurality of types of control information for a plurality of communication terminals for use in uplink packet transmission, using a spreading code and symbol patterns in a plurality of combinations, said plurality of types of control information being provided per communication terminal, wherein
the multiplexer comprises:
a table storing a plurality of symbol patterns that are mutually uncorrelated and differ between the types of control information;
an encoder that encodes a plurality of types of control information for a single communication terminal for use in uplink packet transmission, using the symbol patterns; and
a spreader that spreads the plurality of types of control information after the encoding, using a single common spreading code,
wherein one of the symbol patterns or the plurality of symbol patterns are assigned to the communication terminal and polarities of the assigned one symbol pattern or the assigned plurality of symbol patterns are changed according to the type of control information to be transmitted.

6. A radio network controller apparatus comprising:
a spread code and symbol pattern assigner included in a processor and configured to assign a spreading code and symbol patterns in a plurality of combinations to a plurality of types of control information for a plurality of communication terminals for use in uplink packet transmission, said plurality of types of control information being provided per communication terminal, wherein
the spread code and symbol pattern assigner assigns a single spreading code and symbol patterns that differ between the types of control information, to the plurality of types of control information for a single communication terminal,
wherein one of the symbol patterns or the plurality of symbol patterns are assigned to one of the communication terminals and polarities of the assigned one symbol pattern or the assigned plurality of symbol patterns are changed according to the type of control information to be transmitted.

7. A communication terminal apparatus comprising:
a despreader that despreads a signal from a radio base station apparatus using a single spreading code provided for a single communication terminal apparatus;
a decoder that extracts a plurality of types of control information using symbol patterns provided from the radio base station apparatus, said plurality of types of control information for the communication terminal apparatus being multiplexed in the signal using the plurality of symbol patterns; and
a transmission signal former that forms uplink transmission packets based on the plurality of types of control information extracted by the decoder, wherein
the decoder selects the symbol patterns provided from the radio base station apparatus from a plurality of mutually uncorrelated symbol patterns, and decodes the signal after the despreading using the selected symbol patterns,
wherein one of the symbol patterns or the plurality of symbol patterns are assigned to the communication terminal apparatus and polarities of the assigned one symbol pattern or the assigned plurality of symbol patterns are changed according to the type of control information to be transmitted.

8. The communication terminal apparatus of claim 7, wherein the plurality of types of control information comprises at least one of a packet transmission rate, a coding rate, a spreading factor, the number of spreading codes, a modulation scheme, a packet data size, a transmit power, and information about retransmission.

9. A transmission signal generation method comprising:
selecting symbol patterns that differ between types of control information, from a plurality of mutually uncorrelated symbol patterns stored in a pattern table;
encoding a plurality of types of control information for a single communication terminal using the selected symbol patterns; and
spreading the plurality of types of control information after the encoding, using a single common spreading code,
wherein one of the symbol patterns or the plurality of symbol patterns are assigned to the communication terminal and polarities of the assigned one symbol pattern or the assigned plurality of symbol patterns are changed according to the type of control information to be transmitted.

10. A method of receiving a plurality of types of control information for a communication terminal, the method comprising:
despreading a received signal using a single spreading code common to the plurality of types of control information;
selecting symbol patterns provided from a radio base station apparatus, from a plurality of mutually uncorrelated symbol patterns; and
decoding the signal after the despreading using the selected symbol patterns, wherein one of the symbol patterns or the plurality of symbol patterns are assigned to the communication terminal and polarities of the assigned one symbol pattern or the assigned plurality of symbol patterns are changed according to the type of control information to be transmitted.

11. A radio communication system that transmits a plurality of types of control information for a single communication terminal for use in uplink packet transmission, the radio communication system comprising:
a radio network controller apparatus;
a radio base station apparatus; and
a mobile station apparatus, wherein:
the radio network controller apparatus designates a plurality of symbol patterns, which differ between the plurality of types of control information, and a spreading code common to the plurality of types of control information for the radio base station apparatus and the mobile station apparatus;
the radio base station apparatus transmits the plurality of types of control information to the mobile station apparatus using the plurality of symbol patterns and the spreading code;
the mobile station apparatus extracts the plurality of types of control information using the plurality of symbol patterns and the spreading code, and
the radio network controller apparatus commands the radio base station apparatus and the mobile station apparatus to use different symbol patterns between the types of control information, from a plurality of mutually uncorrelated symbol patterns,
wherein one of the symbol patterns or the plurality of symbol patterns are assigned to the mobile station apparatus and polarities of the assigned one symbol pattern or the assigned plurality of symbol patterns are changed according to the type of control information to be transmitted.

* * * * *